(12) United States Patent
Nam et al.

(10) Patent No.: US 11,454,844 B2
(45) Date of Patent: Sep. 27, 2022

(54) LIGHT SOURCE MEMBER, DISPLAY DEVICE INCLUDING THE SAME, AND MANUFACTURING METHOD FOR THE SAME

(71) Applicant: Samsung Display Co., LTD., Yongin-si (KR)

(72) Inventors: Jieun Nam, Seoul (KR); Dohun Kim, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/097,049

(22) Filed: Nov. 13, 2020

(65) Prior Publication Data

US 2021/0302785 A1 Sep. 30, 2021

(30) Foreign Application Priority Data

Mar. 24, 2020 (KR) .................. 10-2020-0035769

(51) Int. Cl.
*G02F 1/13357* (2006.01)
*G02F 1/1335* (2006.01)

(52) U.S. Cl.
CPC .. *G02F 1/133605* (2013.01); *G02F 1/133621* (2013.01); *G02F 1/133612* (2021.01); *G02F 1/133614* (2021.01); *G02F 2202/36* (2013.01)

(58) Field of Classification Search
CPC ......... G02F 1/133605; G02F 1/133621; G02F 1/133612; G02F 1/133614; G02F 2202/36
See application file for complete search history.

(56) References Cited

U.S. PATENT DOCUMENTS

| | | | | |
|---|---|---|---|---|
| 2013/0320380 A1* | 12/2013 | Kanemaru | .............. | H01L 33/50 438/27 |
| 2014/0092584 A1* | 4/2014 | Ono | ......................... | H01L 33/58 362/296.01 |
| 2016/0238915 A1* | 8/2016 | Kim | ...................... | G09G 3/3648 |
| 2018/0239197 A1* | 8/2018 | Yamano | ............ | G02F 1/133611 |
| 2018/0335559 A1* | 11/2018 | Cho | ..................... | G02B 6/0016 |
| 2019/0177608 A1* | 6/2019 | Chisaka | ............... | C09K 11/565 |
| 2019/0258115 A1* | 8/2019 | Kyoukane | ................ | F21S 2/00 |
| 2019/0324324 A1* | 10/2019 | Tai | ..................... | G02F 1/133603 |
| 2021/0026202 A1 | 1/2021 | Nam et al. | | |

FOREIGN PATENT DOCUMENTS

| | | | | |
|---|---|---|---|---|
| CN | 110673244 A | * | 1/2020 | ........... C09K 11/565 |
| KR | 101575653 B1 | | 12/2015 | |
| KR | 101575655 B1 | | 12/2015 | |
| KR | 101616296 B1 | | 4/2016 | |

* cited by examiner

Primary Examiner — Donald L Raleigh
(74) Attorney, Agent, or Firm — Cantor Colburn LLP

(57) ABSTRACT

A light source member includes a circuit board, a plurality of light emitting elements on the circuit board, and a reflection plate facing the circuit board. The reflection plate includes a base layer defining a plurality of grooves of the reflection plate, each of the plurality of grooves recessed in a direction towards the circuit board, and a light control pattern which wavelength-converts, absorbs or reflects light from the plurality of light emitting elements, on the base layer.

25 Claims, 15 Drawing Sheets

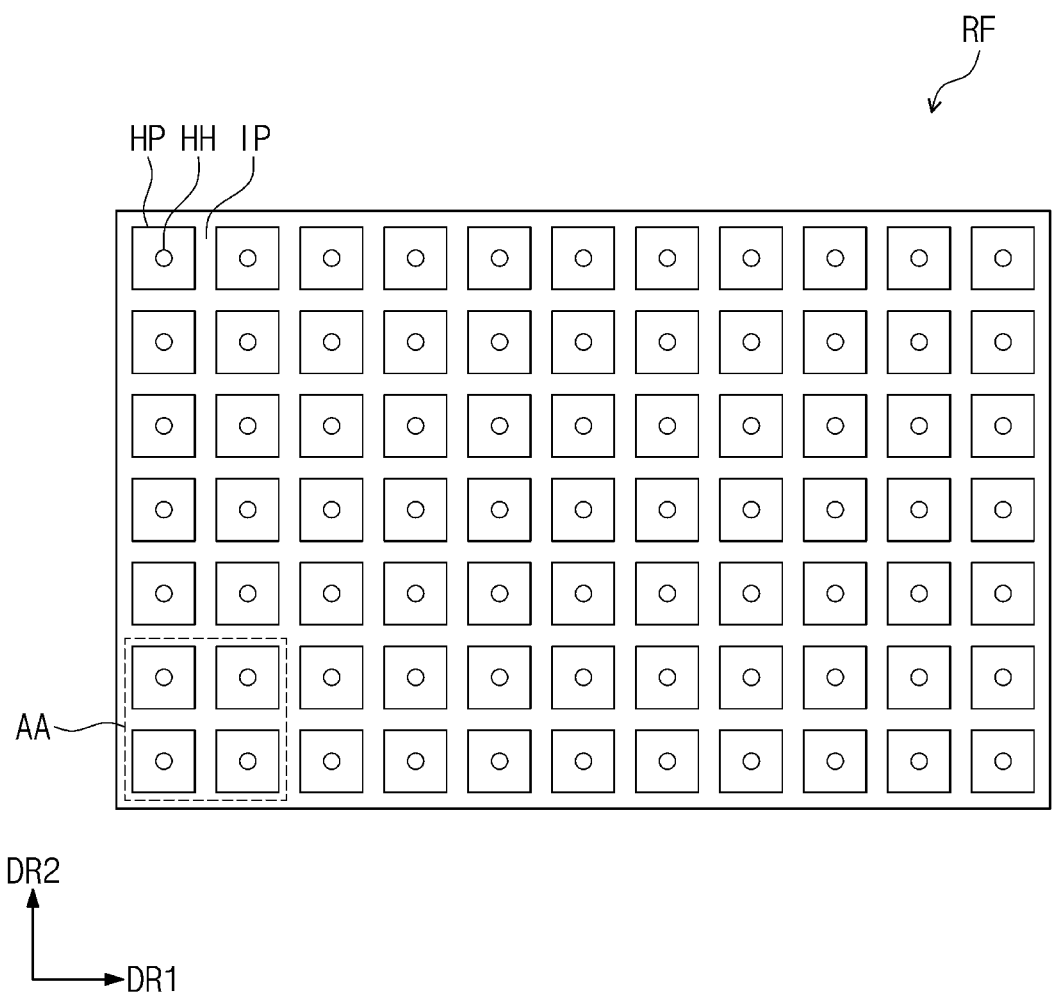

LIGHT SOURCE MEMBER, DISPLAY DEVICE INCLUDING THE SAME, AND MANUFACTURING METHOD FOR THE SAME

This application claims priority to Korean Patent Application No. 10-2020-0035769, filed on Mar. 24, 2020, and all the benefits accruing therefrom under 35 U.S.C. § 119, the entire contents of which are hereby incorporated by reference.

BACKGROUND

(1) Field

The disclosure herein relates to a light source member, a manufacturing method for the same, and a display device including the same. More particularly, the disclosure herein relates to a light source member including a molded reflection plate, a manufacturing method for the same, and a display device including the same.

(2) Description of the Related Art

Various types of display devices are used to provide image information. As a display device, a liquid crystal display device is applied to a large display device, a mobile display device or the like in various ways due to advantages such as low power consumption.

The liquid crystal display device includes a display panel which generates an image using light provided from a light source member referred to as a backlight unit. The backlight unit includes a plurality of light emitting elements for emitting light. Various optical components are added to a lower part of the display panel in order to increase optical efficiency of light emitted from the light emitting elements and raise the color quality and the brightness uniformity of the liquid crystal display device.

SUMMARY

The disclosure provides a direct light type light source member which provides increased brightness uniformity and a reduced color deviation, and a method for manufacturing the same.

The present disclosure also provides a display device including a direct light type light source member which provides improved display quality.

The present disclosure also provides a display device in which display quality reduction, which may be generated by a light emitting element that is selectively turned on or off (e.g., independently driven), is improved.

An embodiment provides a light source member including: a circuit board; a plurality of light emitting elements on the circuit board; and a reflection plate on the circuit board, the reflection plate including a base layer including a plurality of grooves recessed in a direction towards the circuit board and a light control pattern on the base layer.

In an embodiment, the base layer may further define the plurality of grooves spaced apart from each other, a boundary portion between grooves adjacent to each other, and a plurality of through-holes respectively corresponding to the plurality of grooves and through which the plurality of light emitting elements respectively extend, and each of the grooves may be defined by a bottom portion of the base layer which is closest to the circuit board, a through-hole among the plurality of through-holes which is defined through the bottom portion; and a sidewall portion connecting the bottom portion and the boundary portion to each other.

In an embodiment, the light control pattern may include a first pattern on the sidewall portion, inside the groove.

In an embodiment, the first pattern may cover an entirety of the sidewall portion.

In an embodiment, the light control pattern may further include a second pattern extended along the bottom portion, in a direction towards the through-hole from the first pattern, or a third pattern extended along the boundary portion between the grooves adjacent to each other, in a direction away from the first pattern.

In an embodiment, the light control pattern may include a plurality of sub-patterns on the sidewall portion, inside the groove, each of the sub-patterns may define a volume, and the volume of at least one sub-pattern among the plurality of sub-patterns may be different from the volume of remaining sub-patterns.

In an embodiment, volumes of the sub-patterns on the sidewall portion may one of decrease or increase, in a direction from the bottom portion towards the boundary portion.

In an embodiment, each of the light emitting elements may emit blue light, and the light control pattern may include a fluorescent material or a quantum dot for wavelength-converting the blue light.

In an embodiment, the light control pattern may include a pigment or a dye.

In an embodiment, each of the grooves may have a circular, elliptical or polygonal shape, in a plan view.

In an embodiment, the base layer may include polyethylene terephthalate.

In an embodiment, the plurality of light emitting elements may be independently driven from each other.

In an embodiment, the plurality of light emitting elements may be divided into a plurality of light emitting groups, and the light emitting groups may be independently driven from each other.

In an embodiment, a display device includes: a light source member; and a display panel facing the light source member. The light source member includes: a circuit board; a plurality of light emitting elements on the circuit board; and a reflection plate facing the circuit board, the reflection plate including a base layer defining a plurality of grooves each recessed in a direction towards the circuit board and a light control pattern on the base layer.

In an embodiment, the base layer may further define the plurality of grooves spaced apart from each other, a boundary portion furthest from the circuit board and between grooves adjacent to each other, and a plurality of through-holes respectively corresponding to the plurality of grooves and through which the plurality of light emitting elements respectively extend, and each of the grooves may include: a bottom portion of the base layer which is closest to the circuit board; a through-hole among the plurality of through-holes which is defined through the bottom portion; and a sidewall portion connecting the bottom portion and the boundary portion to each other.

In an embodiment, each of the light emitting elements may emit first color light, and the light control pattern may include a fluorescent material for wavelength-converting the first color light, a pigment or a dye for absorbing the first color light, or a pigment or a dye for reflecting the first color light.

In an embodiment, each of the light emitting elements may emit blue light, and the light control may include a yttrium aluminum garnet fluorescent material, a yellow pigment, a blue pigment or a black pigment.

In an embodiment, the display device may further include an optical member between the light source member and the display panel. The optical member may include a color conversion layer including a quantum dot.

In an embodiment, a light source member manufacturing method includes: providing a plurality of light emitting elements on a circuit board; providing a reflection plate including: a plurality of grooves, a plurality of through-holes which respectively correspond to the plurality of grooves, and a light control pattern which wavelength-converts, absorbs or reflects light from the plurality of light emitting elements; and providing the circuit board having the plurality of light emitting elements thereon combined with the reflection plate having the plurality of grooves, the plurality of through-holes and the light control pattern, to respectively extend the plurality of light emitting elements into the plurality of through-holes to provide the light source member. The providing of the reflection plate includes: providing the plurality of grooves and the plurality of through-holes in a base layer; providing a light control pattern material on the base layer, at positions corresponding to the plurality of grooves; and providing the light control pattern from the light control pattern material, by curing the light control pattern material. The providing of the plurality of grooves in the base layer and the providing of the light control pattern material on the base layer, are performed at a same time.

In an embodiment, the providing of the plurality of grooves and the plurality of through-holes in the base layer may include pressing a mold to the base layer to both: deform the base layer in a direction toward the circuit board, which provides the plurality of grooves, and remove portions of the base layer respectively corresponding to the plurality of grooves, which provides the plurality of through-holes.

In an embodiment, the pressing of the mold to the base layer may include defining: each of the plurality of grooves including: a bottom portion of the base layer which is closest to the circuit board and in which a through-hole among the plurality of through-holes is defined, and a sidewall portion of the base layer inclined from the bottom portion, and a boundary portion of the base layer between grooves adjacent to teach other.

In an embodiment, the providing of the light control pattern material on the base layer may include: providing the light control pattern material on the mold at locations corresponding to the light control pattern, and by the pressing of the mold to the base layer, transferring the light control pattern material from the mold to at least one among the sidewall portion, the boundary portion and the bottom portion of the base layer.

In an embodiment, the mold may include: a plurality of first protruding portions corresponding to the plurality of grooves, the plurality of first protruding portions may each include a side surface corresponding to the sidewall portion of the base layer, a plurality of second protruding portions respectively extended from the plurality of first protruding portions and corresponding to the plurality of through-holes; and a support portion common to each of the plurality of first protruding portions and the plurality of second protruding portions and from which each of the plurality of first protruding portions and the plurality of second protruding portions extends. The providing of the light control pattern material on the base layer, at the positions corresponding to the plurality of grooves, may include providing the light control pattern material to the side surface of each of the plurality of first protruding portions of the mold.

In an embodiment, the side surface of each of the plurality of first protruding portions of the mold may include a plurality of holes, and the providing of the light control pattern material on the base layer, at the positions corresponding to the plurality of grooves, may include providing the light control pattern material in the plurality of holes of the mold.

In an embodiment, the base layer may include polyethylene terephthalate, and the light control pattern may include a fluorescent material, a quantum dot, a pigment, or a dye.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain principles of the invention. In the drawings:

FIGS. 7A and 7B are respective top plan views of embodiments of a reflection plate;

DETAILED DESCRIPTION

Figure 1:
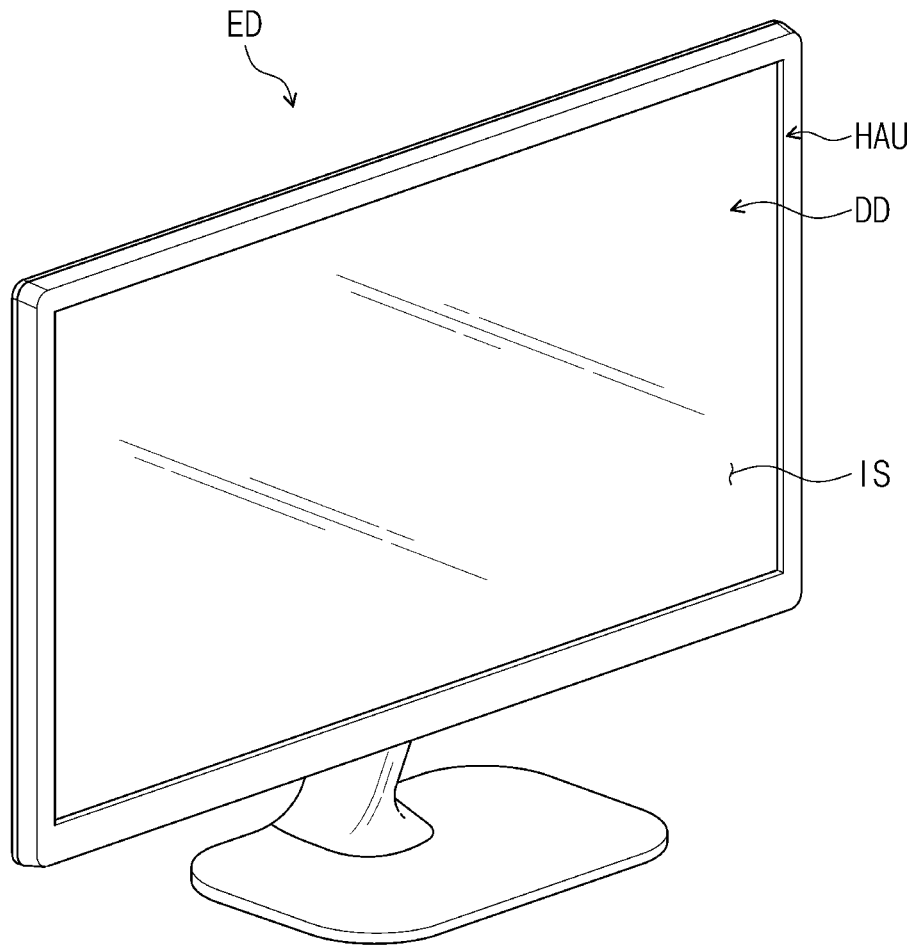
FIG. 1 is a perspective view of an embodiment of an electronic device.

The invention may be variously modified and realized in various forms, and thus specific embodiments will be exemplified in the drawings and described in detail hereinbelow. However, it will be understood that the invention is not intended to be limited to the specific forms set forth herein, and all changes, equivalents, and substitutions included in the technical scope and spirit of the invention are included.

It will be understood that when an element or layer is referred to as being related to another element such as being "on," "connected to" or "coupled to" another element or layer, it can be directly on, connected or coupled to the other element or intervening third elements may be present.

On the other hand, when an element or layer is referred to as being related to another element such as "being directly disposed" another element or layer means that there is not an additional layer, film, region, plate or the like therebetween. For example, "being directly disposed" may mean that disposition of two layers or two members is performed without using an additional member such as an adhesive member therebetween. Element or layers which are "directly disposed" relative to one another may form an interface therebetween.

Like reference numerals in the drawings refer to like elements. In addition, in the drawings, the thickness and the ratio and the dimension of the element are exaggerated for effective description of the technical contents.

Terms such as first, second, and the like may be used to describe various components, but these components should not be limited by the terms. These terms are only used to distinguish one element from another. For instance, a first component may be referred to as a second component, or similarly, a second component may be referred to as a first component, without departing from the scope of the present disclosure.

The terminology used herein is for the purpose of describing particular embodiments only and is not intended to be limiting. As used herein, the singular forms "a," "an," and "the" may be intended to include the plural forms as well, unless the context clearly indicates otherwise. For example, "an element" has the same meaning as "at least one element," unless the context clearly indicates otherwise. "At least one" is not to be construed as limiting "a" or "an." "Or" means "and/or." The term "and/or" includes any and all combinations of one or more of the associated items.

In addition, the terms such as "under," "lower," "on" and "upper" are used for explaining associations of items illustrated in the drawings. It will be understood that the spatially relative terms are intended to encompass different orientations of the device in use or operation in addition to the orientation depicted in the figures. In the present specification, the term "disposed on" may refer to not only an upper part of any member but also a lower part thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, components or combinations thereof, but do not preclude the presence or addition of one or more other features, integers, steps, operations, elements, components, or combinations thereof.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a light source member, a manufacturing method for the same and a display device including the same will be described with reference to the accompanying drawings.

FIG. 1 is a perspective view of an embodiment of an electronic device ED including a display device DD.

The electronic device ED according to the embodiment may include a display device DD and a housing HAU. The electronic device ED illustrated in FIG. 1 or the like may be a large electronic device such as a television, a display monitor and an outdoor billboard. However, these are only presented as examples of the electronic device ED, and another electronic device may be employed without being deviated from the invention. In embodiments, for example, the electronic device ED may be a small or medium-sized electronic device such as a smartphone, a personal computer, a notebook computer, a personal digital assistant, a vehicle navigator, a game console, etc. The electronic device ED may display an image through a display surface IS.

FIG. 1 exemplarily illustrates the display surface IS provided as a surface defined by a first directional axis DR1 (e.g., first direction) and a second directional axis DR2 (e.g., second direction) which intersects with the first directional axis DR1. However, the embodiment is not limited thereto, and the display surface IS may be provided as a curved surface. In an embodiment, for example, the electronic device ED may include a display device DD having a display surface IS which is flat or curved.

The electronic device ED and/or the display device DD has a three-dimensional shape having a thickness along a third directional axis DR3 (e.g., third direction) intersecting the plane defined by the first directional axis DR1 and the second directional axis DR2. The third directional axis DR3 may be perpendicular to the plane, but is not limited thereto. In the specification, an upper surface (or a front surface) and a lower surface (or a rear surface) of each member are defined based on a direction in which the image is displayed at the display surface IS. The upper surface and the lower surface are opposed to each other along the third directional axis DR3, and directions normal to the upper surface and the lower surface may be parallel to the third directional axis DR3. However, the directions indicated by the first to third directional axes DR1, DR2 and DR3 are relative concepts and may be include other directions. Hereinafter, the first to third directions may refer to the same reference numerals in the directions respectively indicated by the first to third directional axes DR1, DR2 and DR3.

The housing HAU may include a material having relatively high hardness. In an embodiment, for example, the housing HAU may include a plurality of frames and/or plates including glass, plastic or metal. The housing HAU provides a receiving space in which other components of the electronic device ED are accommodated. The display device DD may be received in the receiving space to be protected from an external impact from outside of the display device DD. In addition, unlike the illustrated in FIG. 1, for an electronic device ED including a display surface IS which is curved, the housing HAU may have a curved shape, and the display device DD may be fixed in a curved shape according to the housing HAU having the curved shape.

Figure 2:
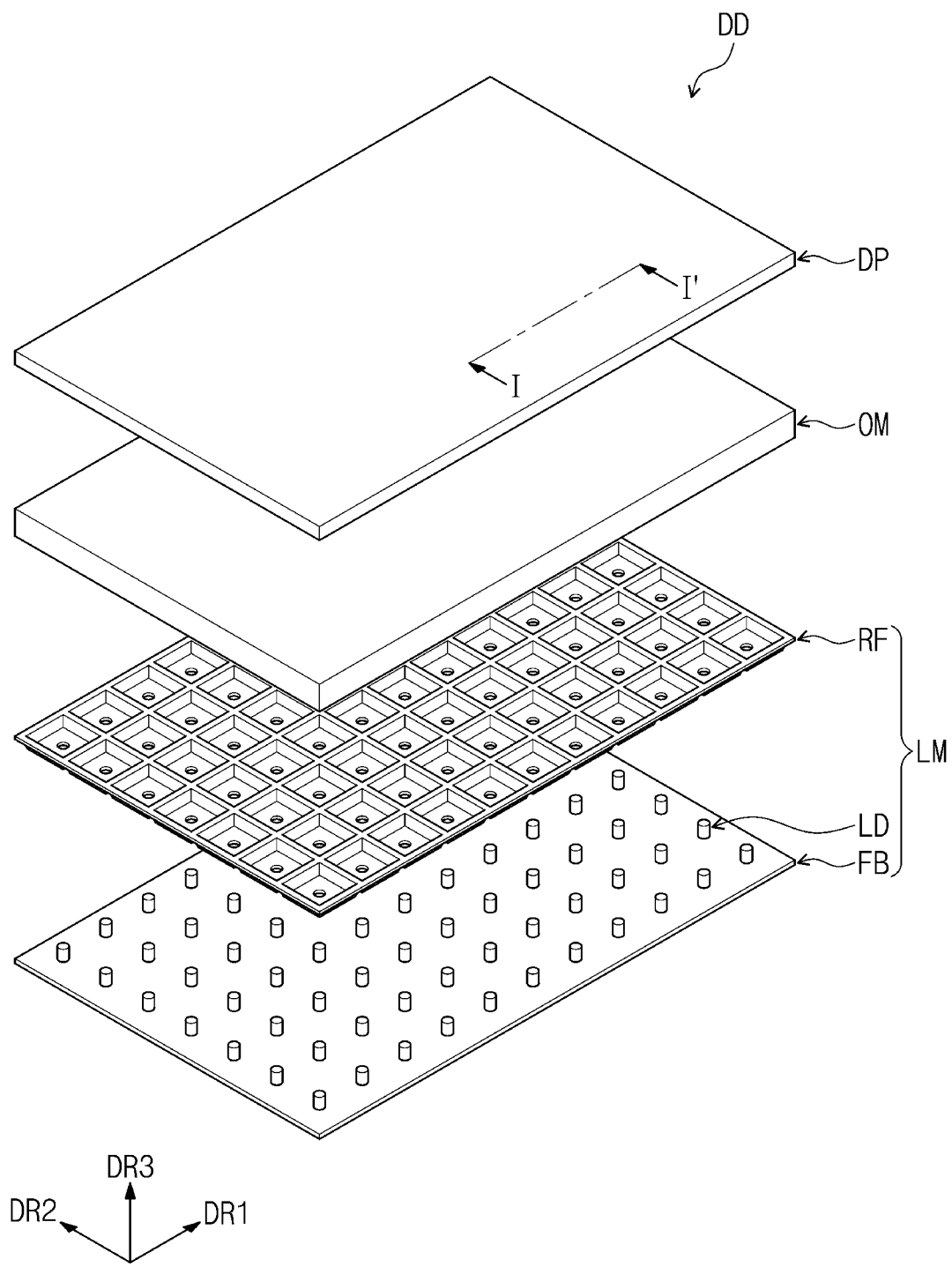
FIG. 2 is an exploded perspective view of an embodiment of a display device.
Figure 3:
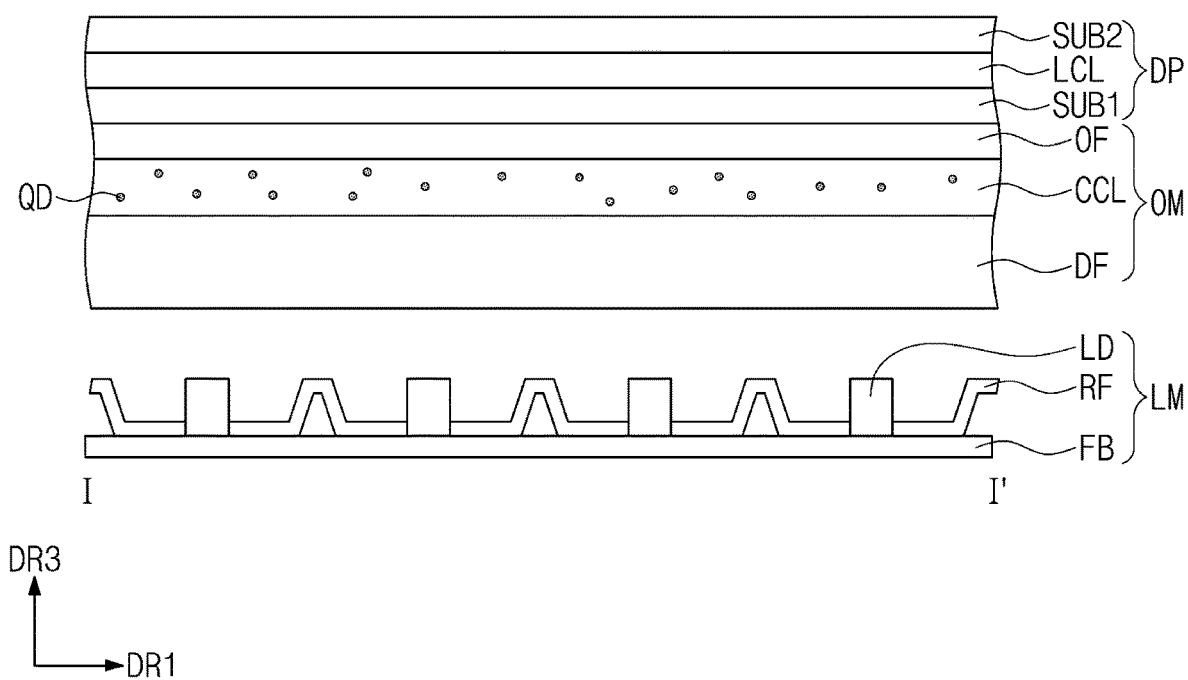
FIG. 3 is a cross-sectional view of an embodiment of the display device taken along line I-I' of FIG. 2.
Figure 4:
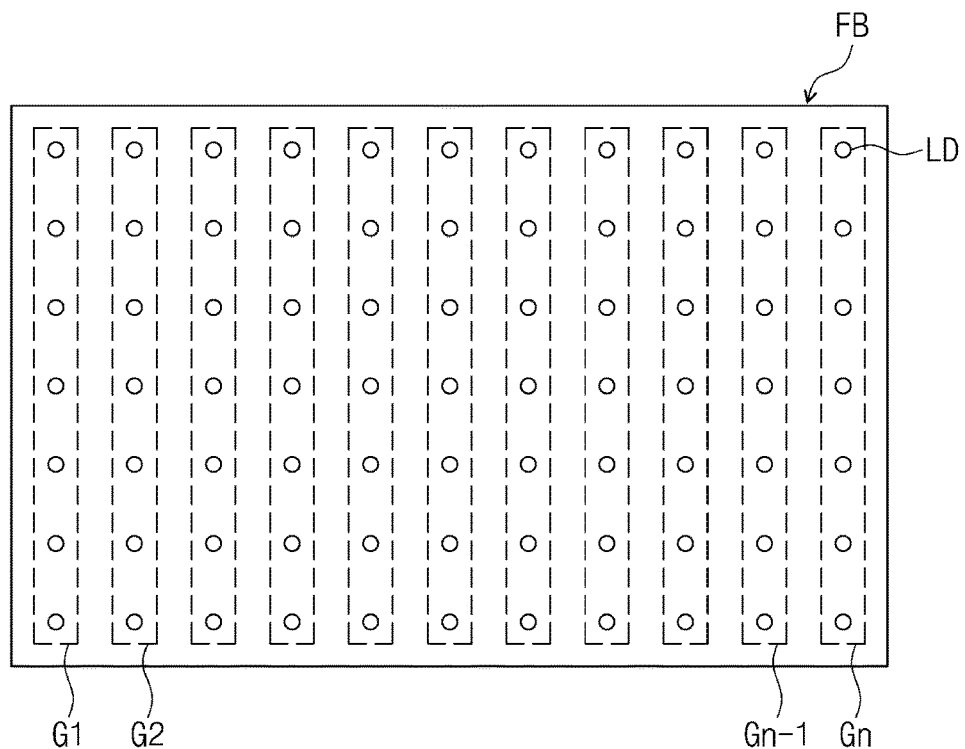
FIG. 4 is a top plan view of an embodiment of a light source member.
Figure 5:
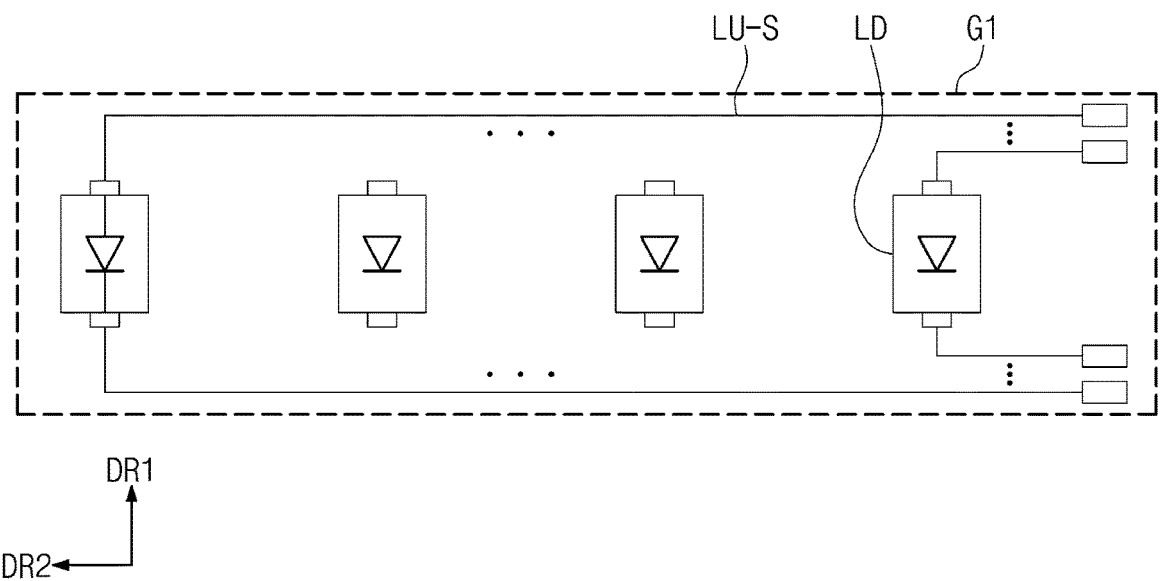
FIG. 5 is an equivalent circuit diagram of an embodiment of a light emitting element.
Figure 6:
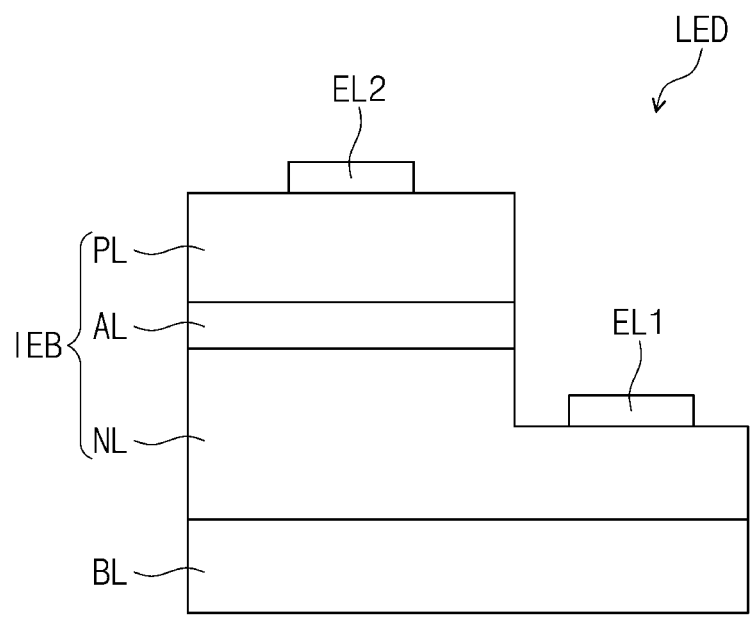
FIG. 6 is a cross-sectional view of an embodiment of a light emitting diode.
Figure 7B:
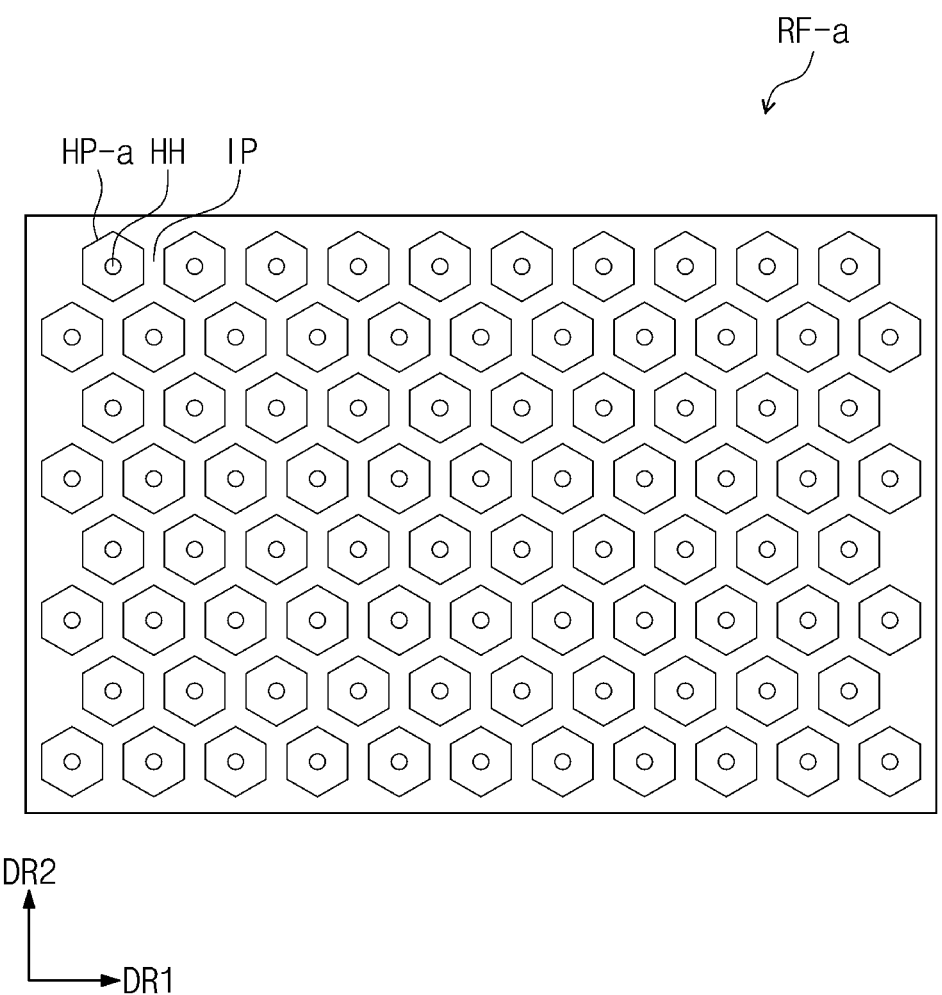

FIG. 2 is an exploded perspective view of an embodiment of a display device DD. FIG. 3 is an embodiment of an enlarged cross-sectional view of the display device DD, which is taken along line I-I' of FIG. 2. FIG. 4 is a top plan (e.g., plan view or planar view) view of an embodiment of a light source member LM. FIG. 5 is an equivalent circuit diagram of an embodiment of a light emitting element LD, and FIG. 6 is an embodiment of an enlarged cross-sectional view of a light emitting diode LED. FIGS. 7A and 7B are respective plan views of embodiments of a reflection plate RF.

The display device DD may include a light source member LM, and a display panel hereinafter referred to as a liquid crystal display panel DP which is disposed on the light source member LM. In addition, the display device DD may include an optical member OM disposed between the light source member LM and the liquid crystal display panel DP. In the display device DD, the liquid crystal display panel DP may overlap the light source member LM along the third directional axis DR3. The liquid crystal display panel DP may be disposed at an upper side of the light source member LM, and the display device DD may be have a light source member LM as a direct light type.

The light source member LM may include a circuit board FB, the light emitting element LD provided in plural to define a plurality of light emitting elements LD which are disposed on the circuit board FB, and a reflection plate RF disposed on the circuit board FB.

The circuit board FB may have a plate shape facing the liquid crystal display panel DP along the third directional axis DR3. Although not shown in the drawing, the circuit board FB may include a base substrate and circuit lines which are mounted on the base substrate. The circuit lines may receive electrical signals from outside of the circuit board FB and deliver the received electrical signals to the light emitting elements LD. The circuit lines may electrically connect the light emitting elements LD to each other or to other elements within the light source member LM.

The light emitting elements LD may receive an electrical signal from the circuit board FB to generate and/or emit light. Although not shown separately, a dimming circuit may be disposed in the circuit board FB. Such a dimming circuit operates to dim the light emitting elements LD based on a control signal received from a central control circuit. In an embodiment, the light emitting elements LD may be turned on or off independently from each other. That is, independent driving of the plurality of light emitting elements LD emits the light from the plurality of light emitting elements LD.

In FIGS. 1 and 2, the light emitting elements LD are illustrated to be disposed separately at a constant interval along the circuit board FB, but the embodiment is not limited thereto. The disposition interval of the light emitting elements LD may be different according to a corresponding position along the circuit board FB, such as a center region or an edge region of the liquid crystal display panel DP.

Referring to FIG. 4, a plurality of light emitting elements LD is divided into a plurality of light emitting groups G1, G2, . . . , Gn-1 and Gn. The light emitting groups G1, G2, . . . , Gn-1 and Gn may be driven independently from each other. In other words, light emitting elements LD in any one light emitting group may be independently controlled from light emitting elements LD in another light emitting group. In an embodiment, for example, in the embodiment illustrated in FIG. 4, the light emitting elements LD included in a first light emitting group G1 may be controlled to be all turned on at a same time, and the light emitting elements LD in a second light emitting group G2 adjacent to the first light emitting group G1 may be controlled to be all turned off at a same time. The same times described above may be simultaneous with each other, without being limited thereto.

FIG. 4 illustrates that the light emitting elements LD mounted on the circuit board FB are divided into the light emitting groups G1, G2, . . . , Gn-1 and Gn including the plurality of light emitting elements LD arranged in a direction parallel to the second directional axis DR2. However, such division of the light emitting groups G1, G2, . . . , Gn-1, and Gn is exemplary, and the light emitting groups G1, G2, . . . , Gn-1 and Gn may be divided in various ways in consideration of the size and shape of each of the light emitting elements LD, the number of the light emitting elements LD mounted on the circuit board FB, the resolution of the display device DD, or the like. In addition, the number of light emitting elements LD included in each light emitting group and an arrangement of the light emitting elements LD within each light emitting group may be different from other light emitting groups.

FIG. 5 exemplarily illustrates a plurality of light emitting elements LD included in one of the first light emitting group G1. The light emitting elements LD may be respectively connected to a signal line LU-S provided in plural to define signal lines LU-S, so as to be dimmable.

Each of the light emitting elements LD may include a light emitting diode LED, or may include a light emitting element package including a light emitting diode LED and a sealing unit (not shown) which protects the light emitting diode LED. The light emitting diode LED may generate and/or emit first color light. In an embodiment, for example, the light emitting diode LED may emit blue light.

When the light emitting diode LED is the light emitting element LD, the light emitting element LD may emit the first color light generated and/or emitted from the light emitting diode LED. When provided in a light emitting element package form, the light emitting element LD may emit the same first color light as that of the light emitting diode LED according to the configuration of the sealing unit (not shown) or the like, or emit a second color light converted in wavelength from the first color light through the influence from a wavelength conversion body included in the sealing unit (not shown).

With reference FIG. 6, the light emitting diode LED may include a support substrate BL, a light emitting structure IEB which is disposed on the support substrate BL, and a first electrode EL1 and a second electrode EL2 which are disposed on the light emitting structure IEB.

The support substrate BL may be a sapphire substrate or include at least one among GaN, SiC, ZnO, GaP, InP, $Ga_2O_3$, GaAs and Si. The support substrate BL may play a role of supporting the light emitting structure IEB.

The light emitting structure IEB may include a first conductive semiconductor layer NL, an activation layer AL, and a second conductive semiconductor layer PL. The first conductive semiconductor layer NL may be implemented with a III-V or II-VI compound semiconductor doped with a first conductive dopant. In an embodiment, for example, when the first conductive type is an n-type, the first conductive semiconductor layer NL may include Si, Ge, Sn, Se, Te or the like as an n-type dopant, but the embodiment is not limited thereto.

The activation layer AL is disposed on the first conductive semiconductor layer NL. The activation layer AL may be a layer in which an electron injected from the first conductive semiconductor layer NL is combined with a hole injected from the second conductive semiconductor layer PL to generate and/or emit light having the energy determined by the intrinsic energy band of a material forming the activation layer AL. The activation layer AL may have a single well structure, a multi-well structure, a single quantum well structure, a multi-quantum well structure, or the like. In an embodiment, for example, the activation layer AL has a multi-quantum well structure, and may include INGaN.

The second conductive semiconductor layer PL is disposed on the activation layer AL. The second conductive semiconductor layer PL faces the first conductive semiconductor layer NL with the activation layer AL therebetween. The second conductive semiconductor layer PL may be implemented with a III-V or II-VI compound semiconductor. In an embodiment, for example, when the second conductive type is a p-type, the second conductive semiconductor layer PL may include Mg, Zn, Ca, Sr, Ba or the like as a p-type dopant, but the embodiment is not limited thereto.

The first electrode EL1 may be disposed on the first conductive semiconductor layer NL at a surface which is exposed to outside the light emitting diode LED. The surface may be exposed by mesa-etching the second conductive semiconductor layer PL, the activation layer AL and a portion of the first conductive semiconductor layer NL. The second electrode EL2 may be disposed on the second conductive semiconductor layer PL. The first and second electrodes EL1 and EL2 may be provided having a single-layered or multi-layered structure including at least one among aluminum (Al), titanium (Ti), chromium (Cr), nickel (Ni), copper (Cu) and gold (Au).

The first and second electrodes EL1 and EL2 may be electrically connected to the circuit board FB. In an embodiment, for example, the first and second electrodes EL1 and EL2 of the light emitting diode LED may be connected to the circuit board FB using wires (not shown) or may be bonded to the circuit board FB in a flip chip type form.

Figure 9A:
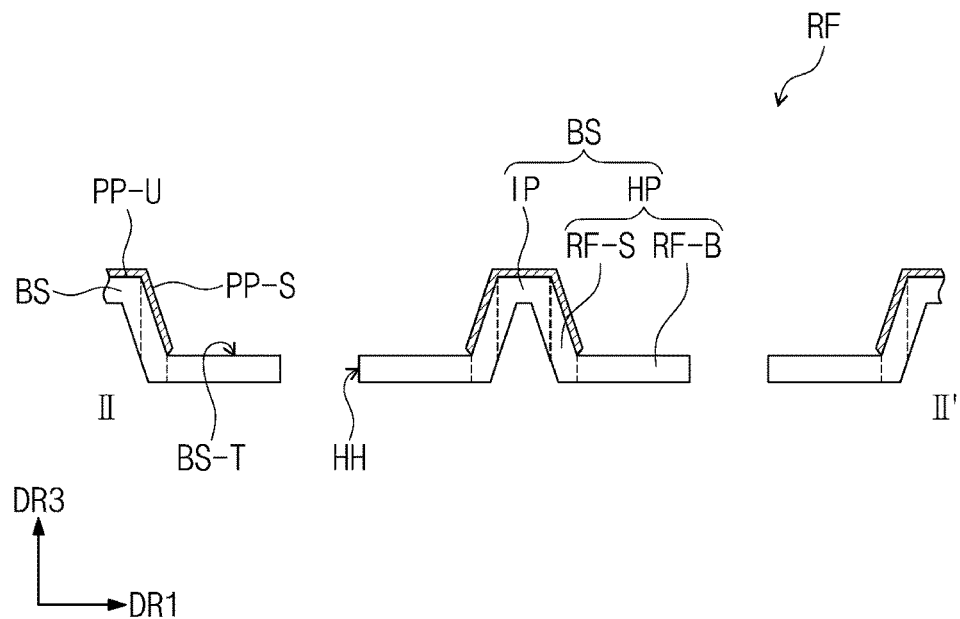
FIGS. 9A to 9D are respective cross-sectional views of embodiments of a reflection plate.

The reflection plate RF included in the light source member LM is disposed on and facing the circuit board FB. The reflection plate RF may include a base layer BS (FIG. 9A) including a groove HP provided in plural to define a plurality of grooves HP, and at least one light control pattern on the base layer BS (FIG. 9A). The light control pattern may be provided on the base layer BS by printing a material onto a surface BS-T of the base layer BS, but is not limited thereto. The light control pattern is hereinafter referred to as a printed pattern PP. That is, the reflection plate RF may include a base layer BS (FIG. 9A) including a groove HP provided in plural to define a plurality of grooves HP, and at least one printed pattern PP among printed patterns PP-S, PP-U and PP-B (FIG. 9B) which are disposed on the base layer BS (FIG. 9A).

The plurality of grooves HP included in the reflection plate RF may be recesses concavely extended in a direction toward the circuit board FB. The plurality of grooves HP may be arranged spaced apart from each other along the reflection plate RF. In a view along the third directional axis DR3 (e.g., plan view) of the plane defined by the first directional axis DR1 and the second directional axis DR2, each of the grooves HP may have a circular, elliptical or polygonal shape (e.g., planar shape).

FIG. 7A illustrates an embodiment in which each of the grooves HP of the reflection plate RF has a rectangular shape in the plan view. In FIG. 7A, the solid lines represented as the boundaries of the grooves HP, show the shapes of the grooves HP at the top surface of the reflection plate RF. With reference to FIG. 7A, the plurality of grooves HP may be arranged in directions respectively parallel to the first directional axis DR1 and the second directional axis DR2. However, unlike the arrangement in FIG. 7A, separation intervals between the grooves HP adjacent to each other among the plurality of grooves HP may be different from each other, and some of the grooves HP may have a different size from the others.

Furthermore, in a plan view of the plane defined by the first directional axis DR1 and the second directional axis DR2, the sizes of the grooves HP may indicate those of the shapes of the portions of the grooves HP at the top surface of the reflection plate RF. A through-hole HH may be defined in each of the grooves HP of the reflection plate RF. The through-hole HH may be defined so as to correspond to a position of the light emitting element LD disposed on the circuit board FB. The through-hole HH is illustrated to have a circular shape in the plan view of FIG. 7A, but the embodiment is not limited thereto. The planar shape of the through-hole HH may vary according to the shape and size of the light emitting element LD which is insertable thereinto.

FIG. 7B is a plan view of an embodiment of a reflection plate RF-a including a groove HP-a provided in plural to define grooves HP-a having a different planar shapes from the grooves HP in the reflection plate RF illustrated in FIG. 7A. With reference to FIG. 7B, the plurality of grooves HP-a may have a hexagonal shape in the plan view of the plane defined by the first directional axis DR1 and the second directional axis DR2. With reference to FIG. 7B, the reflection plate RF-a may have a plurality of grooves HP-a arranged so as to have a honeycomb arrangement. The through-hole HH may be defined in each of the grooves HP-a.

Figure 8:
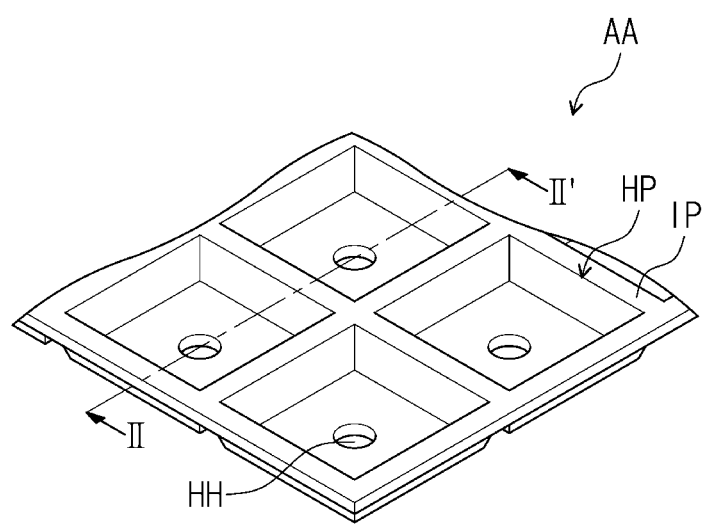
FIG. 8 is an enlarged perspective view showing an embodiment of a reflection plate.
Figure 8:
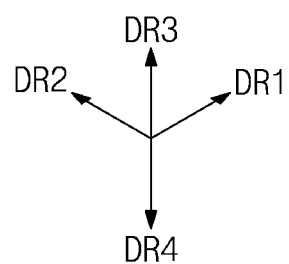

FIG. 8 is a perspective view showing an embodiment of a portion of the reflection plate RF. FIG. 8 represents an embodiment of an enlarged area "AA" of FIG. 7A. FIG. 9A represents a cross-sectional view of an embodiment of the reflection plate RF taken along line II-IF of FIG. 8.

The reflection plate RF may include a base layer BS defining the plurality of grooves HP and at least one printed pattern among printed patterns PP-S and PP-U which are disposed on the base layer BS.

The grooves HP in the reflection plate RF may be concave recesses extended in a fourth directional axis DR4 and open in the third directional axis DR3. Within the light source member LM (FIG. 3), the grooves HP of the reflection plate RF may be concavely recessed in a direction toward the circuit board FB (FIG. 3). The base layer BS defines a boundary part IP (e.g., boundary portion) disposed between the grooves HP of the reflection plate RF. In an embodiment, the base layer BS may be molded to define the grooves HP provided in a concave shape. The grooves HP are separated from each other along the reflection plate RF and a portion of the base layer BS between grooves HP which are adjacent to each other may be defined as the boundary part IP. The boundary part IP may be flat to define a flat surface parallel to the plane defined by the first directional axis DR1 and the second directional axis DR2. However, the embodiment is not limited thereto.

The grooves HP may be defined by a bottom part RF-B (e.g., bottom portion) of the base layer BS through which a through-hole HH among the plurality of through-holes HH is defined, and a sidewall part RF-S (e.g., sidewall portion) of the base layer BS which is disposed between the bottom part RF-B and the boundary part IP. The sidewall part RF-S of the base layer BS connects the bottom part RF-B and the boundary part IP to each other. The bottom part RF-B may be adjacent to the circuit board FB (FIG. 3). The bottom part RF-B may be a portion of the base layer BS which is closest to the circuit board FB, while the boundary part IP may be a portion of the base layer BS which is furthest from the circuit board FB. Although not shown, a bonding layer may be further disposed between the bottom part RF-B and the circuit board FB (FIG. 3).

The sidewall part RF-S is extended from the bottom part RF-B, and may be bent along the third directional axis DR3 (e.g., the thickness direction) from the bottom part RF-B. In FIG. 9A, the sidewall part RF-S is illustrated as inclined relative to and extended from the bottom part RF-B, but the embodiment is not limited thereto. The sidewall part RF-S may be extended in a direction vertical (e.g., perpendicular) relative to the bottom part RF-B.

The base layer BS defining portions of the reflection plate RF may be a film or a substrate including or formed of a polymer resin. The base layer BS may include polyethylene terephthalate ("PET"). In an embodiment, the base layer BS of the reflection plate RF may be formed by press-molding a PET film into a three dimensional shape. The base layer BS may further include a reflective material other than the PET. In an embodiment, for example, the base layer BS may further include $TiO_2$, $SiO_2$ or the like.

The bottom part RF-B through which the through-hole HH is defined, the boundary part IP between the grooves HP, and the sidewall part RF-S disposed between the bottom part RF-B and the boundary part IP as portions of a same one of the base layer BS may be integral with each other. That is, one part among the bottom part RF-B, the boundary part IP and the sidewall part RF-S may extend to define one or more of the other parts.

The reflection plate RF may include at least one printed pattern among printed patterns PP-S and PP-U disposed on a surface BS-T of the base layer BS. The surface BS-T may correspond to a top surface of the base layer BS which is adjacent to the liquid crystal display panel DP (FIG. 3) in consideration of a direction in which light emitted from the light emitting element LD (FIG. 3) is delivered to the liquid crystal display panel DP (FIG. 3). The surface BS-T may include surface portions of the base layer BS at the bottom part RF-B, the boundary part IP and the sidewall part RF-S, which are respectively closest to the liquid crystal display panel DP along the third directional axis DR3.

The printed patterns PP-S and PP-U may include a light conversion body which converts a wavelength of the light emitted from the light emitting element LD, or may include a material which absorbs or reflects the light emitted from the light emitting element LD. The printed patterns PP-S and PP-U may include a fluorescent material, a quantum dot, a pigment or a dye.

The printed patterns PP-S and PP-U may include a yellow fluorescent material or a green fluorescent material, but the embodiment is not limited thereto. Fluorescent materials, which may be excited by the light emitted from the light emitting element LD, may be selectively included. In addition, the printed patterns PP-S and PP-U may also include a quantum dot as the light conversion body. In an embodiment, for example, a combination of the light conversion body included in the printed patterns PP-S and PP-U may vary in consideration of color coordinates of white light used by the display device DD (FIG. 3).

The printed patterns PP-S and PP-U may include a pigment or a dye. In an embodiment, for example, the printed patterns PP-S and PP-U may include a yellow pigment or dye, a blue pigment or dye or a black pigment or dye. The printed patterns PP-S and PP-U may include a pigment or a dye to selectively absorb or reflect a portion of the light emitted from the light emitting element LD.

In an embodiment, for example, where the light emitting element LD (FIG. 3) emits blue light, the printed patterns PP-S and PP-U may include a yellow fluorescent material or a green fluorescent material for converting the wavelength of the blue light, and, more specifically, the printed patterns PP-S and PP-U may include an Yttrium Aluminum Garnet ("YAG") fluorescent material. In addition, where the light emitting element LD (FIG. 3) emits blue light, the printed patterns PP-S and PP-U may include a blue pigment, a yellow pigment or a black pigment for absorbing a portion of the light emitted from the light emitting element LD (FIG. 3).

In other words, one or more embodiment of the light source member LM may include a reflection plate RF in which a printed pattern PP is provided or formed inside the groove HP, to absorb, reflect and/or wavelength-convert a portion of the light which is emitted from the light emitting element LD, and thus the bright uniformity and color characteristics of the light provided from the light source member LM may be improved. In addition, in the light source member LM including light emitting elements LD which are independently driven, one of the light emitting element LD is disposed in each of the grooves HP which has the concave shape and on which the printed pattern PP is provided or formed to minimize non-uniform brightness according to whether light emitting elements LD adjacent to each other are turned on or off.

Referring to FIG. 9A, the reflection plate RF may include a first printed pattern PP-S (e.g., first pattern) extended along the sidewall part RF-S of the base layer BS. The first printed pattern PP-S may be provided on the sidewall part RF-S for defining the inside of the groove HP. The first printed pattern PP-S may be provided with one layer so as to cover an entirety of the sidewall part RF-S from the boundary part IP to the bottom part RF-B. However, the embodiment is not limited thereto, and the first printed pattern PP-S may be selectively provided to a portion of the sidewall part RF-S. In addition, the first printed pattern PP-S may be provided in a form including a plurality of sub-patterns. A portion of the top surface of the base layer BS at the bottom part RF-B is exposed outside the first printed pattern PP-S.

The reflection plate RF may further include a second printed pattern PP-U (e.g., second pattern) extended along the boundary part IP. The second printed pattern PP-U may be disposed on the boundary part IP corresponding to the top surface of the base layer BS. The top surface of the base layer BS may be a surface which is furthest from the circuit board FB. The second printed pattern PP-U may be extended from the first printed pattern PP-S. The second pattern PP-U and the first printed pattern PP-S may be connected to each other to define a single printed pattern. However, the embodiment is not limited thereto, and the second printed pattern PP-U may be spaced apart from (e.g., disconnected from) the first printed pattern PP-S.

The through-hole HH is defined in the base layer BS at the bottom part RF-B of the reflection plate RF, and the light emitting element LD is insertable into each of a through-hole HH to be disposed inside a groove HP.

Figure 9B:
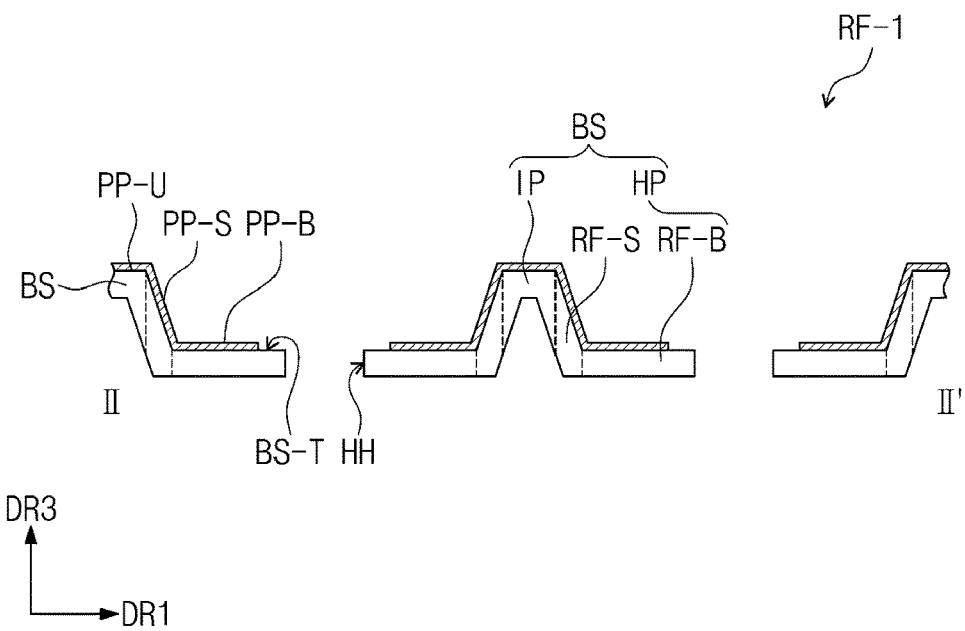
Figure 9C:
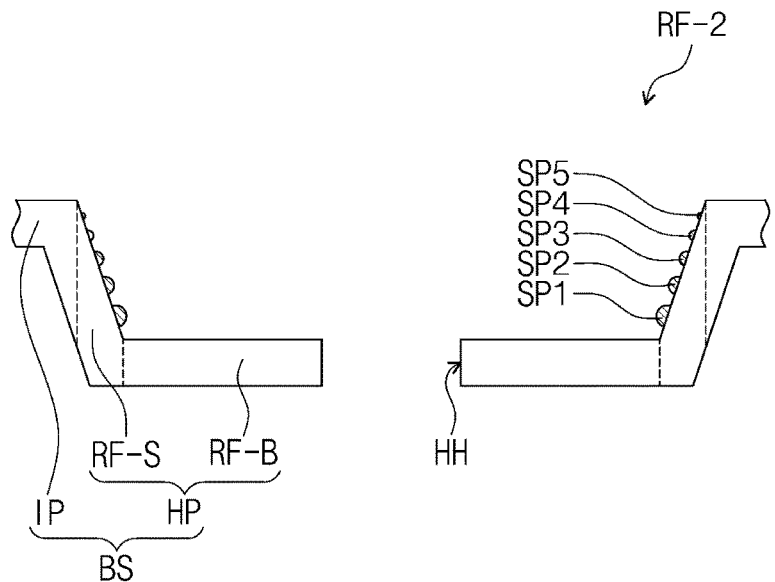
Figure 9D:
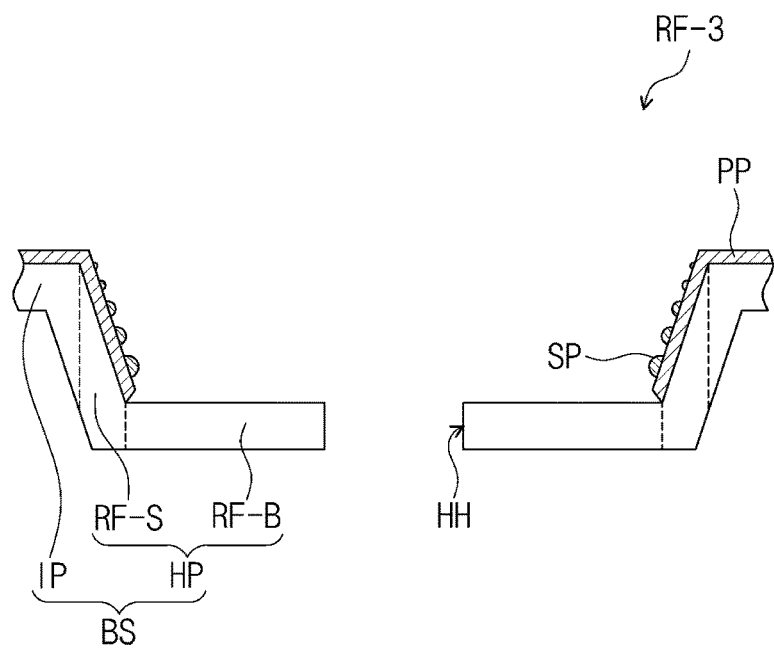

FIGS. 9B to 9D respectively show embodiments of the reflection plate RF. In the description for FIGS. 9B to 9D, repetitive descriptions with FIGS. 1 to 9A will be omitted and the difference will be explained.

FIGS. 9B to 9D show embodiments of a printed pattern PP having different shapes from the shape of the printed pattern PP disposed on the base layer BS in FIG. 9A. The shapes of the reflection plate RF illustrated in FIGS. 9A to 9D are exemplary, and the embodiments are not limited thereto.

With reference to FIG. 9B, the reflection plate RF-1 may include the base layer BS defining the groove HP and the boundary part IP, and the printed patterns PP-S and PP-U disposed at the upper part of the base layer BS. The reflection plate RF-1 illustrated in FIG. 9B further includes a third printed pattern PP-B (e.g., third pattern) disposed on the bottom part RF-B of the base layer BS, which is different from the reflection plate RF illustrated in FIG. 9A. The third printed pattern PP-B may be extended from the first printed pattern PP-S in a direction toward the through-hole HH. The third printed pattern PP-B and the first printed pattern PP-S may include or be formed of the same material. However, the embodiment is not limited thereto, and the third printed pattern PP-B and the first printed pattern PP-S may include or be formed of different materials such as different resins. The third printed pattern PP-B and the first printed pattern PP-S are not integrally provided, but are provided by separate individual patterns. The third printed pattern PP-B disposed corresponding to the bottom part RF-B may reflect the light emitted from the light emitting element LD towards the bottom part RF-B, and redirect the light in the direction of the directional axis DR3. A portion of the top surface of the base layer BS at the bottom part RF-B is exposed outside the third printed pattern PP-B.

In addition, the reflection plate RF-1 is illustrated in FIG. 9B to include all of the first printed pattern PP-S, the second printed pattern PP-U and the third printed pattern PP-B, but the embodiment is not limited thereto, and the second printed pattern PP-U may be omitted.

With reference to FIGS. 9C and 9D, a reflection plate RF-2 and a reflection plate RF-3 may include a sub-pattern SP provided in plural to define a plurality of sub-patterns SP1 to SP5 as a printed pattern. With reference to FIG. 9C, the reflection plate RF-2 may include a plurality of sub-patterns SP1 to SP5 as the first printed pattern PP-S disposed on the sidewall part RF-S of the base layer BS. In a cross-sectional view of the plane defined by the first directional axis DR1 and the third directional axis DR3, the plurality of sub-patterns SP1 to SP5 may each protrude from the sidewall part RF-S. In an embodiment, for example, each of the sub-patterns SP1 to SP5 may have a semicircular, ellipsoidal, cylindrical or polygonal columnar shape in cross-section.

The volume of at least one sub-pattern among the plurality of sub-patterns SP1 to SP5 may be different from those of the remaining sub-patterns. The volume of a printed pattern PP or a sub-pattern SP is defined in three directions, but relative volumes may be represented by the cross-sectional shape of the printed pattern PP or the sub-pattern SP in the Figures. With reference to FIG. 9C, for example, the plurality of sub-patterns SP1 to SP5 in the reflection plate RF-2 are separated from each other along the third directional axis DR3, which is the thickness direction, and respective volumes of the plurality of sub-patterns SP1 to SP5 become smaller in a direction towards the boundary part IP from the bottom part RF-B. The volumes of the plurality of sub-patterns SP1 to SP5 disposed along the sidewall part RF-S may be adjusted by means of the cross-sectional area of a portion of the sub-pattern SP extended along the sidewall part RF-S and at which the sub-pattern SP is attached to the sidewall part RF-S, the height taken normal to the sidewall part RF-S, or the like. Referring to FIGS. 9C and 9D, for example, the cross-sectional area of the portion is defined by a dimension of the sub-pattern SP along the sidewall part RF-S and a dimension into the page (not shown).

With reference to FIGS. 9C and 9D, a height of a sub-pattern SP is taken in a direction away from the sidewall part RF-S, such as in a direction normal to the top surface of the base layer BS at the sidewall part RF-S. Respective heights of the plurality of sub-patterns SP1 to SP5 become larger in a direction towards the bottom part RF-B from the boundary part IP. However, the embodiment is not limited thereto.

In an embodiment, the cross-sectional areas of the portions of the plurality of sub-patterns SP1 to SP5, which are respectively extended along the sidewall part RF-S in two dimensions and at which the sub-patterns SP1 to SP5 are attached to the sidewall parts RF-S are the same as each other, and only the heights in a direction away from the sidewall part RF-S may be adjusted. Alternatively, the cross-sectional areas of the portions at which the sub-patterns SP1 to SP5 are attached to the sidewall parts RF-S are different from each other, and the heights protruding from the sidewall part RF-S may be the same as each other.

In the embodiment illustrated in FIGS. 9C and 9D, when the plurality of sub-patterns SP1 to SP5 are printed patterns including a light-absorbing dye or pigment, the quantity of the absorbed light may be larger as the volumes of the sub-patterns SP1 to SP5 become larger. In other words, in the reflection plate RF-2, an amount of light absorption in the first sub-pattern SP1 which is closest to the bottom part RF-B may be larger than an amount of light absorption in the fifth sub-pattern SP5 which is closest to the boundary part IP (e.g., furthest from the bottom part RF-B). In other words, for the reflection plate RF-2, an absorption amount of a light ray having a relatively larger view angle or emission angle among light rays emitted from the light emitting elements LD (FIG. 3) may be larger.

In an embodiment, unlike the shown in FIGS. 9C and 9D, the respective volumes of the plurality of sub-patterns SP1 to SP5 may become larger in a direction towards the boundary part IP from the bottom part RF-B. In this case, the light absorption amount in the sub-pattern SP5 which is closest to the boundary part IP may be larger than that in the sub-pattern SP1 which is closest to the bottom part RF-B, and the quantity of light delivered to the boundary part IP may be reduced. That is, volumes of the plurality of sub-patterns SP1 to SP5 arranged along the sidewall part RF-S one of decreases or increases in a direction from the bottom part RF-B towards the boundary part IP.

In an embodiment, the respective volumes of the sub-patterns SP1 to SP5 in the reflection plate RF-2 are not varied, and the volume of a sub-pattern SP at a location along the sidewall part RF-S may be made larger than others of the sub-pattern SP, in consideration of the optical characteristics of for the display device DD (FIG. 3).

The description about the sub-patterns SP1 to SP5 is provided for the printed pattern PP which includes a light absorbing dye or pigment, and this may also be similarly applied to the printed pattern PP which includes a wavelength conversion body, or a reflection dye or pigment. In other words, when the printed pattern PP includes the wavelength conversion body, the quantity of wavelength-converted light may increase, as the volume of the sub-pattern SP among a plurality thereof becomes larger, and when the printed pattern PP includes the light reflection pigment or dye, the quantity of reflected light may increase, as the volume of the sub-pattern SP becomes larger. In addition, the sub-patterns SP1 to SP5 may respectively include or be formed of printed resins having different optical characteristics from each other. In an embodiment, for example, the first sub-pattern SP1 may further include a pigment or dye having a light reflection function to be different than the fifth sub-pattern SP5, and the fifth sub-pattern SP5 may further include a pigment or dye having a light absorption function to be different than the first sub-pattern SP1.

FIG. 9D illustrates an embodiment of a reflection plate RF-3 including the sub-pattern SP provided in plural and a printed pattern PP provided as one continuous, unitary layer. The reflection plate RF-3 illustrated in FIG. 9D is different from the embodiment illustrated in FIG. 9C as further including the printed pattern PP disposed between the sidewall part RF-S and the boundary part IP of the base layer BS. The sub-pattern SP faces the sidewall part RF-S of the base layer BS with the printed pattern PP therebetween. Each sub-pattern SP and the printed pattern PP is provided as one layer may be independently provided or formed by including a single layer of fluorescent material, a quantum dot, a pigment or a dye.

One or more embodiment of the light source member LM described with reference to FIGS. 2 to 9D may have increased brightness uniformity and reduced a yellow halo phenomenon, which may occur at the boundary between grooves HP which are adjacent to each other, to show improved optical characteristics by including at least one of the printed pattern PP and the reflection plate RF having the grooves HP.

With reference to FIGS. 2 and 3 again, the display device DD may include the light source member LM, the optical member OM, and the liquid crystal display panel DP overlapping each other along the third directional axis DR3, that is, the thickness direction.

The light provided from the light source member LM may be delivered to the liquid crystal display panel DP. The optical member OM may convert the light emitted from the light source member LM to deliver converted light to the liquid crystal display panel DP. The optical member OM may include a color conversion layer CCL.

The light source member LM in the display device DD may adopt the light source member LM of one or more of the foregoing embodiments. In other words, the description about one or more of the foregoing light source member LM may be identically applied to the display device DD according to one or more embodiment.

The liquid crystal display panel DP in the display device DD may include a first substrate SUB1, a second substrate SUB2 opposing to the first substrate SUB1, and an optical control layer such as a liquid crystal layer LCL disposed between the first substrate SUB1 and the second substrate SUB2. That is, the first substrate SUB1 faces the second substrate SUB with the optical control layer therebetween. The liquid crystal display panel DP may include a plurality of pixels at which light is generated, light is emitted, an image is displayed, etc.

Signal lines and pixel circuits of the pixels are provided or formed on any one of the first substrate SUB1 (hereinafter, an array substrate) and the second substrate SUB2. The array substrate may be connected to a main circuit board through a chip on film ("COF") or the like (not shown). A central control circuit for driving the liquid crystal display panel DP may be disposed in the main circuit board. The central control circuit may be a microprocessor. A chip of the COF may be a data driving circuit. A gate driving circuit may be mounted to the array substrate, or be integrated on the array substrate as a low temperature poly-silicone ("LTPS") type.

The central control circuit may control the light emitting elements LD. The control signal for controlling the light emitting elements LD may be transmitted to a dimming circuit of the light emitting elements LD.

First color light provided from the light emitting element LD of the light source member LM may be provided as white light to the liquid crystal display panel DP while passing through the color conversion layer CCL of the optical member OM. In other words, the light provided from the light source member LM may be finally provided as white light to the liquid crystal display panel DP by a combination of the light emitting element LD of the light source member LM and a quantum dot QD provided in plural to define quantum dots QD included in the color conversion layer CCL.

The optical member OM in the display device DD may include the color conversion layer CCL including at least one of the quantum dot QD. The quantum dot QD may be a particle which converts the wavelength of the light provided from the light source member LM (e.g., wavelength-converts light).

The quantum dot QD is a material having a crystalline structure of several nanometers in size, includes several hundred to thousand atoms, and shows a quantum confinement effect in which the energy band gap is increased due to a small size thereof. When light having a wavelength of higher energy than the band gap is incident to the quantum dot QD, the quantum dot QD absorbs the light to become an excited state, and drops to the ground state while emitting light of a specific wavelength. The emitted light has a value corresponding to the band gap. When the size and composition of the quantum dot QD are adjusted, the emission characteristics may be adjusted due to the quantum confinement effect. The quantum dot !D may be selected from among a group II-VI compound, a group III-V compound, a group IV-VI compound, a group IV element, a group IV compound, a group I-III-VI compound, and a combination thereof.

In an embodiment, the color conversion layer CCL may include different quantum dots QD for wavelength-converting the color of the incident light into colors of different wavelength ranges. In an embodiment, for example, the color conversion layer CCL may include a first quantum dot for wavelength-converting first color light emitted from the light emitting element LD into second color light, and a second quantum dot for wavelength-converting the first color light emitted from the light emitting element LD into third color light, where the second color light has a different color than the third color light.

In an embodiment, when the light provided from the light emitting element LD is in a wavelength range of blue light, the quantum dots QD included in the color conversion layer CCL may include a first quantum dot for converting blue light into green light, and a second quantum dot for converting the blue light into red light. Specifically, when the light provided from the light emitting element LD is blue light having a maximum light emission peak (or a central wavelength) in a range of about 420 nanometers (nm) to about 470 nm, the first quantum dot emits green light having a maximum light emission peak (or a central wavelength) in a range of about 520 nm to about 570 nm, and the second quantum dot emits red light having a maximum light emission peak (or a central wavelength) in a range of about 620 nm to about 670 nm. However, the blue light, the green light, and the red light are not respectively limited to the foregoing wavelength ranges, and should be understood to include all wavelength ranges to be perceived as blue light, green light and red light in the present technical field.

In the display device DD, the optical member OM may further include a diffusion plate DF. The diffusion plate DF diffuses the light provided and incident from the light source member LM to increase the brightness uniformity of the light provided from the light source member LM. The color conversion layer CCL in the optical member OM may be disposed on the diffusion plate DF. The diffusion plate DF and the color conversion layer CCL may be in order in a light emission direction (e.g., upward in FIG. 3). In other words, the diffusion plate DF may play a role of a support substrate provided with the color conversion layer CCL thereon. In an embodiment, the diffusion plate DF may be omitted from the display device DD which includes a light source member LM of a direct type.

The optical member OM may further include at least one of an optical film OF. The optical member OM may include a prism sheet. In an embodiment, for example, the optical member OM may include a plurality of optical sheets such as a brightness enhancement film ("BEF"), a dual brightness enhancement film ("DBEF"), or the like.

One or more embodiment of a display device DD may include a light source member LM including a groove HP and a reflection plate RF having a printed pattern PP provided inside the groove HP, and thus, increase the brightness uniformity of the light provided from the plurality of light emitting elements LD provided in a direct type device to show improved optical quality. One or more embodiment may provide a display device DD including a reflection plate RF having a printed pattern PP for wavelength-converting, absorbing and/or reflecting light, and thus, a yellow halo limitation or a brightness mura phenomenon may be improved which may be caused by different light emitting elements LD that are independently driven and disposed adjacent to each other.

Figure 10:
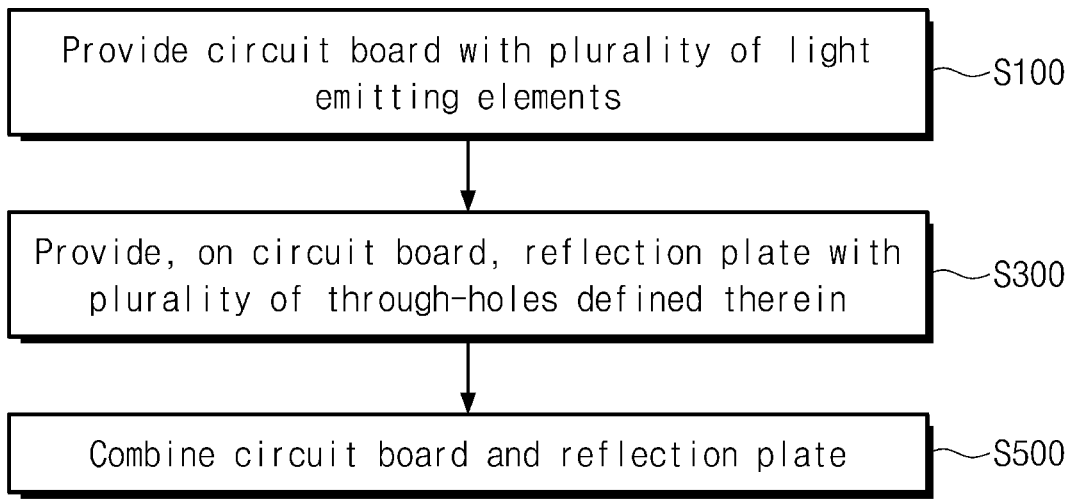
FIG. 10 is a flowchart showing an embodiment of a manufacturing method of a light source member.
Figure 11:
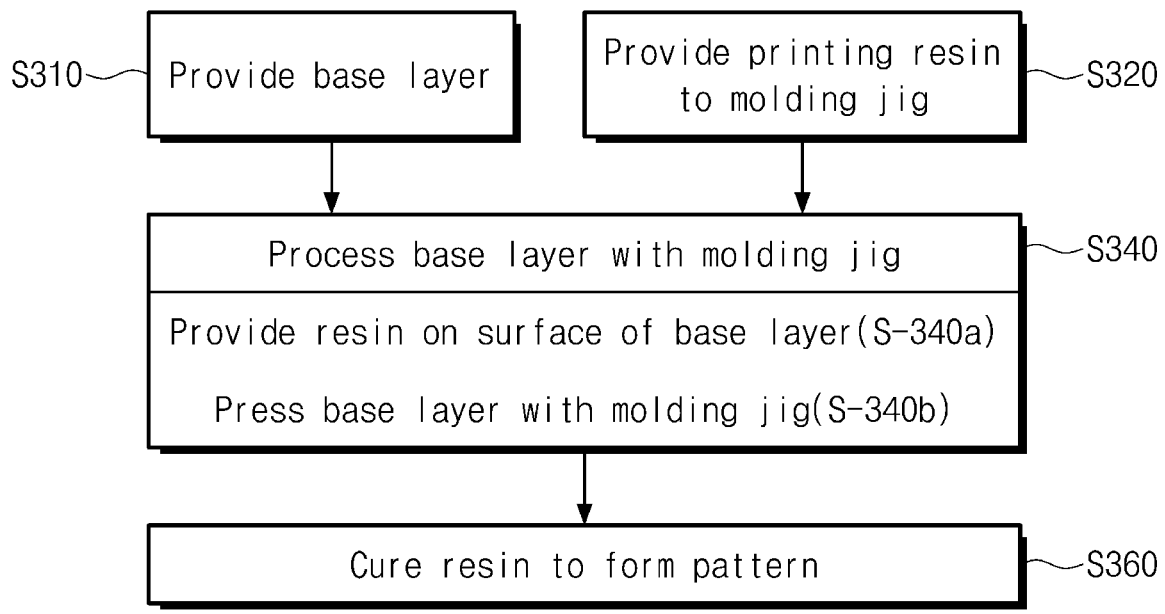
FIG. 11 is a flowchart showing an embodiment of manufacturing method of a reflection plate.
Figure 12A:
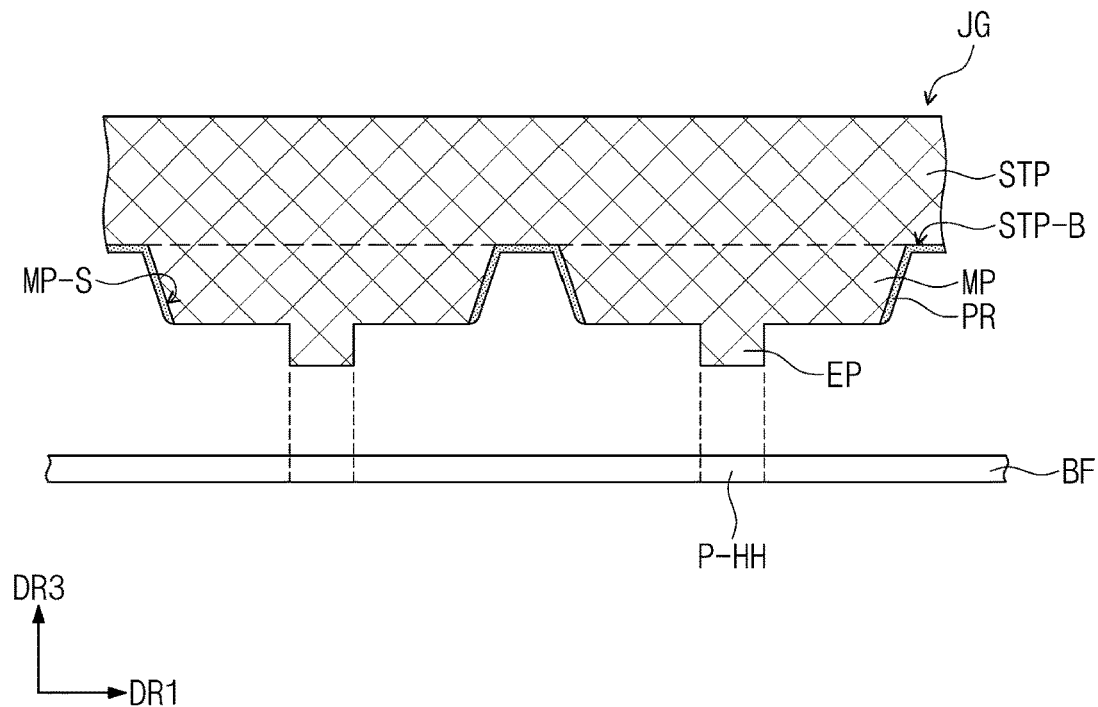
FIGS. 12A to 12C are cross-sectional views showing an embodiment of processes in a manufacturing method of a reflection plate.
Figure 12B:
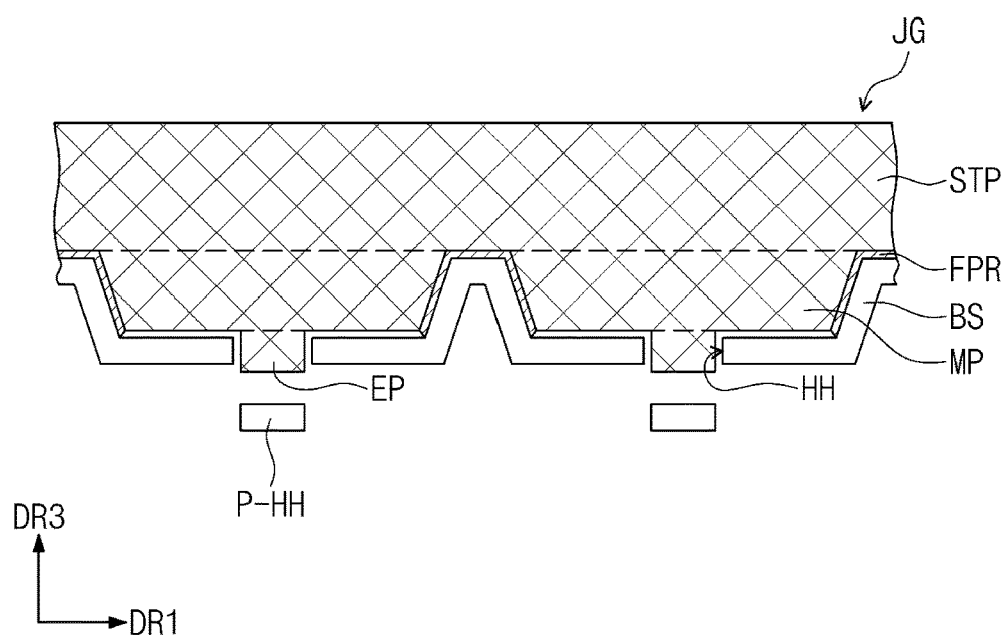
Figure 12C:
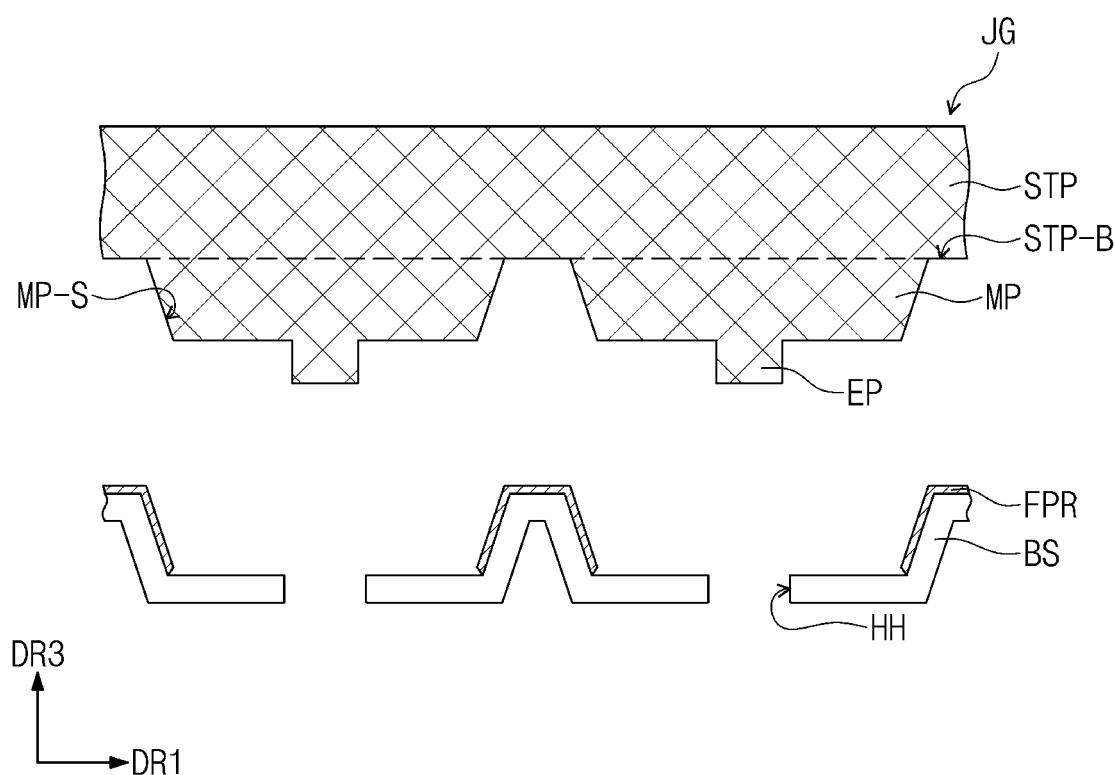
Figure 13:
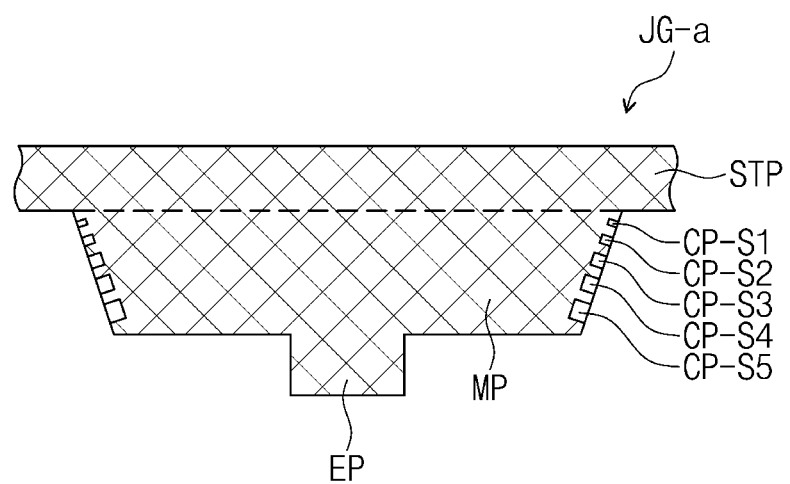
FIG. 13 is a cross-sectional view of an embodiment of a mold.

Hereinafter, an embodiment of a manufacturing method of a light source member LM will be described with reference to FIGS. 10 to 13. FIG. 10 is a flowchart showing an embodiment of processes of a method of manufacturing the light source member LM, and FIG. 11 is a flowchart showing in more detail an embodiment of a process of providing a reflection plate RF. FIGS. 12A to 12C are cross-sectional views of structures in an embodiment of a method of providing a reflection plate RF. FIG. 13 is a cross-sectional view showing an embodiment of a molding jig JG (e.g., mold).

A method of manufacturing the light source member LM may include providing a circuit board FB with a plurality of light emitting elements LD disposed therein (S100), providing on the circuit board FB, a reflection plate RF through which a plurality of through-holes HH are defined (S300), and combining the circuit board FB and the reflection plate RF to each other (S500). The combining the circuit board FB and the reflection plate RF may include arranging the circuit board FB and the reflection plate RF and combining the two elements so that the light emitting elements LD disposed on the circuit board FB are respectively inserted into the through-holes HH. The circuit board FB and the reflection plate RF in the light source member LM (FIG. 3) may be provided arranged and/or combined with each other without a separate bonding member. Alternatively, the circuit board FB and the reflection plate RF may be combined with each other by using a bonding layer as a separate member provided therebetween.

In one or more embodiment of the method of manufacturing the light source member LM, the providing a reflection plate RF may include forming or providing the reflection plate RF. FIG. 11 is a flowchart showing an embodiment of S300 for providing a reflection plate RF before assembly with other components of the display device DD. The providing a reflection plate within S300 may include providing a base layer BS (S310), providing a resin PR to a molding jig JG such as by printing (S320), processing the base layer BS with the molding jig JG (S340), and the resin PR to form a light control pattern such as a printed pattern PP (S360). That is, the providing of the reflection plate RF includes providing the plurality of grooves HP and the plurality of through-holes HH in a base layer BS, providing a light control pattern material on the base layer BS, at positions corresponding to the plurality of grooves HP, and providing the light control pattern (e.g., printed pattern PP) from the light control pattern material, by curing the light control pattern material. The providing of the plurality of grooves HP in the base layer BS and the providing of the light control pattern material on the base layer BS, are performed at a same time.

The providing a base layer BS (S310) and the providing a resin PR (S320) to a molding jig JG may be performed separately. The providing a base layer BS (S310) and the providing a resin PR (S320) to a molding jig JG may be performed separately and in parallel. However, the embodiment is not limited thereto, and any one process among S310 and S320 may be performed first.

The processing the base layer BS with the molding jig JG (S340) may include providing a resin PR on one surface of the base layer BS (S-340a) and pressing the base layer BS with the molding jig JG (S-340b). In one or more embodiment of manufacturing the light source member LM, the providing a resin PR on one surface of the base layer BS (S-340a) and the pressing the base layer BS with the molding jig JG (S-340b) may be performed in one process. In other words, the providing the resin PR on one surface of the base layer BS (S-340a) and the pressing the base layer BS with the molding jig JG (S-340b) may be performed substantially at the same time.

FIG. 12A illustrates resin PR is provided to the molding jig JG. The molding jig JG having the resin PR may be disposed facing a base film BF. The molding jig JG may include or be formed of a metal material. In an embodiment, for example, the molding jig JG may include stainless steel ("SUS"). The molding jig JG may be heated or cooled, during the method of manufacturing a reflection plate RF.

The molding jig JG may include a stamping part MP (e.g., first protruding portion) provided in plural to define a plurality of stamping parts MP (e.g., first protruding portions) for molding the grooves HP (FIG. 9A) of the reflection plate RF (FIG. 9A), and a cutting part EP (e.g., second protruding portion) provided in plural (e.g., second protruding portions) for defining the through-hole HH (FIG. 9A) in the base film BF. In addition, the molding jig JG may include a support unit STP (e.g., support layer) for supporting the plurality of stamping parts MP. That is, the mold may include a plurality of first protruding portions corresponding to the plurality of grooves HP, the plurality of first protruding portions each including a side surface MP-S corresponding to the sidewall portion of the base layer BS, a plurality of second protruding portions respectively extended from the plurality of first protruding portions and corresponding to the plurality of through-holes HH, and a support portion common to each of the plurality of first protruding portions and the plurality of second protruding portions and from which each of the plurality of first protruding portions and the plurality of second protruding portions extends.

The resin PR may include a light conversion body, a pigment or a dye. The light conversion body may be a fluorescent material or a quantum dot. In an embodiment, for example, the resin PR may include a YAG fluorescent material, a yellow pigment, a blue pigment or a black pigment. The resin PR may further include a binding material other than the light conversion body, the pigment or the dye. The binding material may correspond to a medium or material in which the light conversion body, the pigment or the dye is dispersed. The binding material may include a light curable material and/or a heat curable material.

The resin PR may be provided on a side surface MP-S of the molding jig JG defined at the stamping part MP of the molding jig JG. In other words, the providing a resin PR to the molding jig JG (S320) may include providing the resin PR to the side surface MP-S of the stamping part MP which defines an outer side surface thereof. The resin PR may be provided to a portion of a bottom surface STP-B of the support part STP which is exposed between stamping parts MP which are adjacent to each other, as well as on the side surface MP-S of the stamping part MP. The resin PR may also be provided to the bottom surface STP-B of the support part STP facing the base film BF at an outer edge of the molding jig JG. The resin PR provided to the side surface MP-S of the stamping part MP may provide or form the first printed pattern PP-S (FIG. 9A) disposed on the sidewall part RF-S (FIG. 9A) of the groove HP. In addition, the resin PR provided to the bottom surface STP-B of the support part STP may provide or form the second printed pattern PP-U (FIG. 9A) disposed on the boundary part IP (FIG. 9A). That is, the first printed pattern PP-S and the second printed pattern PP-U are respective portions of the resin PR provided on the molding jig JG.

The base film BF may be a film or a substrate including or formed of a polymer resin. The base film BF may be polyethylene terephthalate ("PET") film. In the present specification, the base film BF may refer to the base layer BS which is unprocessed (e.g., a preliminary form of the base layer BS). The base film BF is press-molded with the molding jig JG, and then processed to provide the base layer BS through which the through-hole HH is defined.

A preliminary hole part P-HH (e.g., preliminary hole portion) of the base film BF, corresponding to the through-hole HH, may be removed with the cutting part EP of the molding jig JG, so as to provide or form the through-hole HH.

FIG. 12B illustrates providing the resin PR on one surface of the base film BF (S-340a) and pressing the base film BF with the molding jig JG. In other words, the providing resin PR on one surface of the base film BF (S-340a) and the pressing the base film BF with the molding jig JG (S-340b) may include converting the base film BF into the base layer BS by press-molding the base film BF with the molding jig JG having the resin PR to convert the base film BF into the base layer BS, and providing the resin PR on one surface of the base layer BS to form a preliminary pattern FPR.

The providing resin PR on one side of the base film BF (S-340a) may include transferring the resin PR provided to the molding jig JG to at least one portion of the base film BF corresponding to the sidewall part RF-S (FIG. 9A), the boundary part IP (FIG. 9A) and the bottom part RF-B (FIG. 9A) of the base layer BS. The resin PR transferred to the base layer BS as a molded form of the base film BF, may be referred to as the preliminary pattern FPR (e.g., resin pattern). That is, the providing of the plurality of grooves HP and the plurality of through-holes HH in the base layer BS includes pressing a mold to the base layer BS to both deform the base layer BS in a direction toward the circuit board FB, which provides the plurality of grooves HP, and remove portions of the base layer BS respectively corresponding to the plurality of grooves HP, which provides the plurality of through-holes HH.

FIG. 12C illustrates the resin PR transferred to the base layer BS and disposed on the base layer BS as the preliminary pattern FPR, and the molding jig JG separated from the base layer BS having the preliminary pattern FPR. That is, the providing of the light control pattern material on the base layer BS includes providing the light control pattern material on the mold at locations corresponding to the light control pattern, and by the pressing of the mold to the base layer BS, transferring the light control pattern material from the mold to at least one among the sidewall portion, the boundary portion and the bottom portion of the base layer BS. The providing of the light control pattern material on the base layer BS, at the positions corresponding to the plurality of grooves HP may further include providing the light control pattern material to the side surface MP-S of each of the plurality of first protruding portions of the mold.

In other words, the reflection plate RF described with reference to FIGS. 9A and 9B, may be provided or formed from the process S340 in which the base film BF is processed with the molding jig JG described with reference to FIGS. 12A to 12C, to provide the base layer BS of FIGS. 9A and 9B.

FIG. 13 is a cross-sectional view showing an embodiment of the molding jig JG used in a method of manufacturing the light source member LM. The molding jig JG-a may be used for manufacturing the embodiments of the reflection plate RF-2 and the reflection plate RF-3 described with reference to FIGS. 9C and 9D. The molding jig JG-a illustrated in FIG. 13 may be used for providing or forming the sub-patterns SP1 to SP5, and SP in the embodiments of the reflection plate RF-2 and the reflection plate RF-3 illustrated in FIGS. 9C and 9D.

The molding jig JG-a may include a plurality of holes CP-S1 to CP-S5 into which resin PR is filled. The plurality of holes CP-S1 to CP-S5 may be defined recessed into the side surface MP-S of the stamping part MP. The plurality of holes CP-S1 to CP-S5 may be dented to inside the stamping part MP from the side surface MP-S (e.g., outer side surface) of the stamping part MP. That is, the providing of the light control pattern material on the base layer BS, at the positions corresponding to the plurality of grooves HP may include providing the light control pattern material in the plurality of holes CP-S1 to CP-S5 of the mold.

The sizes or dimensions of the holes CP-S1 to CP-S5 for providing or forming the sub-patterns SP1 to SP5, and SP may be different from each other. In an embodiment, for example, in the embodiments of the reflection plate RF-2 and the reflection plate RF-3 illustrated in FIGS. 9C and 9D, the sizes of the holes CP-S1 to CP-S5 in the molding jig JG-a, which respectively correspond to the sub-patterns SP1 to SP5, and SP, may be defined so that the volumes thereof become gradually smaller, in a direction from the cutting part EP towards the support part STP. However, the embodiment is not limited thereto, and the sizes, the disposition positions and/or the shapes of the holes CP-S1 to CP-S5 may be changed according to the shapes and sizes of the sub-patterns SP1 to SP5 of the reflection plate RF.

Referring to FIGS. 10 and 11 again, the providing a reflection plate RF (S300) may include processing the base film BF with the molding jig JG (S340) and curing the resin PR (S360) to form a printed pattern PP. The resin PR may be heat-cured or ultraviolet-cured to provide the preliminary pattern FPR as a resin pattern. That is, the preliminary pattern FPR may be a cured form of the resin PR to define a cured resin pattern.

One or more embodiment of a method of manufacturing the light source member LM may provide the printed pattern PP as a cured portion of a resin PR, while molding the shape of the base layer BS of the reflection plate RF. Thus, the printed pattern PP (e.g., resin pattern) may be provided along a bent or inclined part of the reflection plate RF having a three-dimensional shape, which improves the durability of the printed pattern PP on the reflection plate RF. In addition, the printed pattern PP may be provided at a desired position along the shape of the groove HP, and accordingly, the optical characteristics of the reflection plate RF may be easily implemented.

When the printed pattern PP is provided after molding to form the base layer BS having the groove HP and the through-hole HH, providing the printed pattern PP along the three-dimensional shape of the base layer BS which is molded, may be difficult. In addition, when the printed pattern PP is initially provided on the base film BF, and the base film BF having the printed pattern PP is molded to provide the base layer BS having the groove HP and the through-hole HH, the printed pattern PP may be detached or deformed during the molding process. However, in one or more embodiment of a method of manufacturing the light source member LM, when providing resin PR on the base film BF and pressing the base film BF having the resin PR are performed in one process or simultaneously, the reflection plate RF in which the quality of the printed pattern PP is maintained and which has the three-dimensional shape including the grooves HP may be easily manufactured.

Figure 14A:
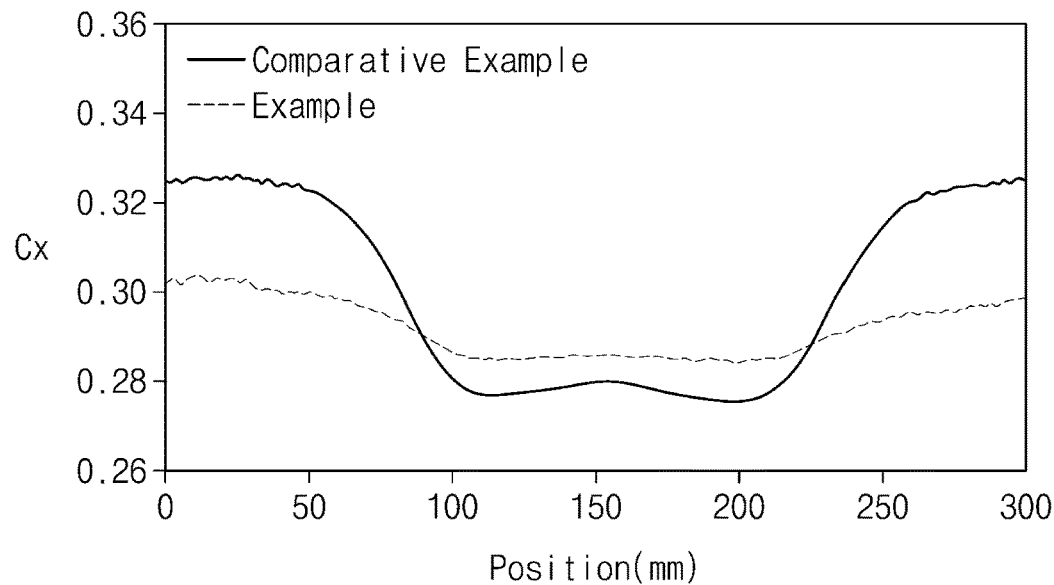
FIG. 14A is a graph showing a Cx color coordinate value in display devices of a comparative example and an embodiment.
Figure 14B:
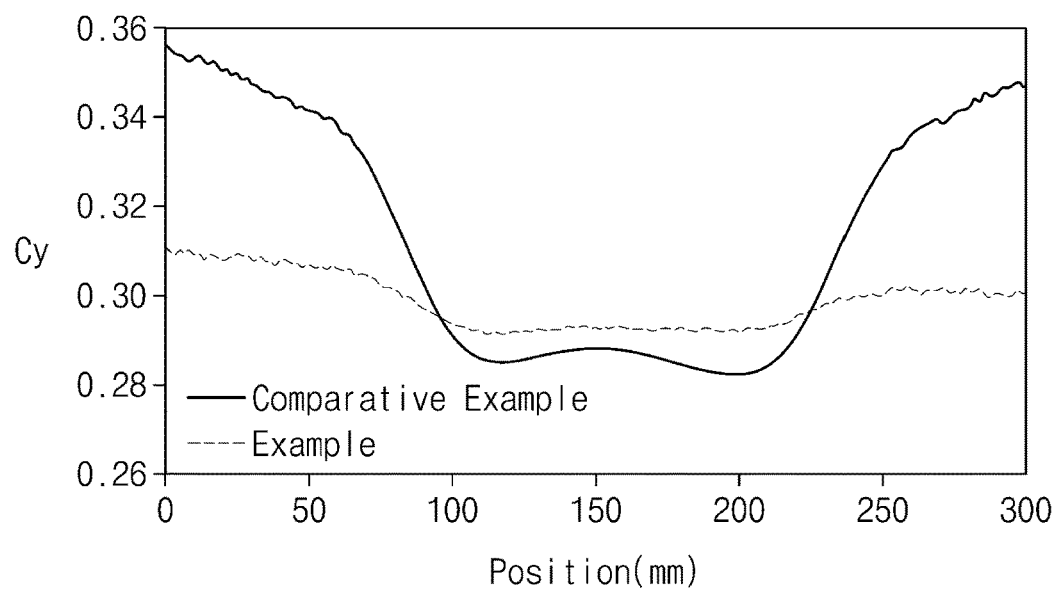
FIG. 14B is a graph showing a Cy color coordinate value in display devices of a comparative example and an embodiment.

FIGS. 14A and 14B are graphs showing color coordinates according to positions in a display device DD of an embodiment of the invention and a display device DD of a comparative example. The embodiment in FIGS. 14A and 14B has a display device DD including a structure of the embodiment illustrated in FIG. 3. In particular, the display device DD represented in FIGS. 14A and 14B corresponds to the embodiment in which the reflection plate RF includes the printed patterns PP-S and PP-U as shown in FIG. 9A. The comparative example represented in FIGS. 14A and 14B has the same structure of a base layer BS in a reflection plate RF, and corresponds to the display device DD having the same structure as the embodiment except for excluding the printed pattern PP.

In the graphs in FIGS. 14A and 14B, "the position (mm)" on the x-axis corresponds to a relative position on the basis of one side of the display device DD, when viewed on a plane. In the results shown in FIGS. 14A and 14B, the position of the x-axis is shown as 0 millimeter (mm) to 300 millimeters (mm), and a portion corresponding to 150 mm corresponds to a center portion of the tested display device.

FIGS. 14A and 14B respectively show color coordinates of the display devices of the embodiment and the comparative example, when the quantity of light emitted from the light emitting element LD of the light source member LM at a portion corresponding to 150 mm is the largest and dimming is performed so that the quantity of the light from the light emitting elements LD corresponding to each position gradually decreases, as proceeding towards one side (0 mm) and an opposing side (300 mm).

FIG. 14A shows a comparison result for a Cx color coordinate, and FIG. 14B shows a comparison result for a Cy color coordinate. With reference to FIGS. 14A and 14B, a change in color coordinate according to a position change in the display device DD of the embodiment may be observed to be smaller than a change in coordinate according to a position change in the display device DD of the comparative example. For the maximum values of change amounts in the color coordinates of the comparative example, $\Delta Cx$ is 0.050 and $\Delta Cy$ is 0.080, and for the maximum values of change amounts in the color coordinates of the embodiment, $\Delta Cx$ is 0.015 and $\Delta Cy$ is 0.009.

In other words, when the dimming is performed so that the quantity of light from the light emitting elements LD gradually decreases, as proceeding from the center portion to one of opposing ends, the color coordinates for the embodiment gradually change, but the comparative example shows rapid changes in coordinates. Accordingly, the display device DD of the embodiment may be determined to have excellent color quality and optical characteristics, since a rapid color difference on the display surface IS of the display device DD is not perceived.

Accordingly, one or more embodiment of the display device DD may have excellent brightness uniformity by including the concavely provided shapes of the grooves HP, and the reflection plate RF having the printed pattern PP for light conversion, light absorption and/or light reflection. In addition, in one or more embodiment, the light source member LM and the display device DD may be implemented in which brightness mura caused by light emitting elements LD independently controlled from each other, or color difference caused by adjacent light emitting elements, is improved.

One or more embodiment may provide the light source member LM with the brightness uniformity and an improved yellow halo by including at least one of the printed pattern PP, and the reflection plate RF having the grooves HP.

One or more embodiment may provide a method for manufacturing a light source member LM having improved optical characteristics, the method including providing the reflection plate RF by providing resin PR and deforming a base film BF to form the base layer BS, at substantially the same time.

In addition, one or more embodiment may provide the display device DD having the improved optical display quality by including the at least one of the printed pattern PP and providing the light source member LM including the reflection plate RF having the grooves HP.

While this invention has been described with reference to embodiments thereof, it will be clear to those of ordinary skill in the art to which the invention pertains that various changes and modifications may be made to the described embodiments without departing from the spirit and technical area of the invention as defined in the appended claims and their equivalents.

Thus, the scope of the invention shall not be restricted or limited by the foregoing description, but be determined by the broadest permissible interpretation of the following claims.

What is claimed is:

1. A light source member comprising:
   a circuit board;
   a reflection plate facing the circuit board, the reflection plate comprising in order from the circuit board:

a base layer having a cross-sectional shape defining a plurality of grooves of the reflection plate, each of the plurality of grooves recessed in a direction towards the circuit board, and a light control pattern layer on the base layer and in the plurality of grooves which are defined by the base layer, which wavelength-converts, absorbs or reflects light, the light control pattern layer having a shape corresponding to the cross-sectional shape of the base layer; and a plurality of light emitting elements in the plurality of grooves which include the light control pattern layer on the base layer.

2. The light source member of claim 1, wherein
the base layer further defines:
  the plurality of grooves spaced apart from each other,
  a boundary portion between grooves adjacent to each other, and
  a plurality of through-holes respectively corresponding to the plurality of grooves and through which the plurality of light emitting elements respectively extend, and
each of the plurality of grooves is defined by:
  a bottom portion of the base layer which is closest to the circuit board,
  a through-hole among the plurality of through-holes which is defined through the bottom portion; and
  a sidewall portion connecting the bottom portion and the boundary portion to each other.

3. The light source member of claim 2, wherein inside each of the plurality of grooves, the light control pattern layer comprises a first pattern layer extended along the sidewall portion.

4. The light source member of claim 3, wherein inside each of the plurality of grooves, the first pattern layer covers an entirety of the sidewall portion.

5. The light source member of claim 3, wherein the light control pattern layer further comprises:
  a second pattern layer extended along the bottom portion, in a direction towards the through-hole from the first pattern layer, or
  a third pattern layer extended along the boundary portion between the grooves adjacent to each other, in a direction away from the first pattern layer.

6. The light source member of claim 2, wherein
inside each of the plurality of grooves, the light control pattern layer comprises a layer including a plurality of sub-patterns arranged along the sidewall portion,
each of the plurality of sub-patterns defines a volume, and
the volume of at least one sub-pattern among the plurality of sub-patterns is different from the volume of remaining sub-patterns.

7. The light source member of claim 6, wherein volumes of the plurality of sub-patterns arranged along the sidewall portion one of decreases or increases in a direction from the bottom portion towards the boundary portion.

8. The light source member of claim 1, wherein
each of the plurality of light emitting elements emits blue light as the light from the plurality of light emitting elements, and
the light control pattern layer comprises a fluorescent material or a quantum dot which wavelength-converts the blue light.

9. The light source member of claim 1, wherein the light control pattern layer comprises a pigment or a dye which absorbs or reflects the light from the plurality of light emitting elements.

10. The light source member of claim 1, wherein each of the plurality of grooves has a circular, elliptical or polygonal shape, in a plan view of the base layer.

11. The light source member of claim 1, wherein the base layer comprises polyethylene terephthalate.

12. The light source member of claim 1, wherein independent driving of the plurality of light emitting elements emits the light from the plurality of light emitting elements.

13. The light source member of claim 1, wherein
the plurality of light emitting elements are divided into a plurality of light emitting groups, and
independent driving of the plurality of light emitting groups emits the light from the plurality of light emitting elements.

14. A display device comprising:
a light source member; and
a display panel facing the light source member,
wherein the light source member comprises:
  a circuit board;
  a reflection plate facing the circuit board, the reflection plate comprising in order from the circuit board:
    a base layer having a cross-sectional shape defining a plurality of grooves of the reflection plate, each of the plurality of grooves recessed in a direction towards the circuit board, and
    a light control pattern layer on the base layer and in the plurality of grooves which are defined by the base layer, which wavelength-converts, absorbs or reflects light, the light control pattern layer having a shape corresponding to the cross-sectional shape of the base layer; and
  a plurality of light emitting elements in the plurality of grooves which include the light control pattern layer on the base layer.

15. The display device of claim 14, wherein
the base layer further defines
  the plurality of grooves spaced apart from each other,
  a boundary portion furthest from the circuit board and between grooves adjacent to each other, and
  a plurality of through-holes respectively corresponding to the plurality of grooves and through which the plurality of light emitting elements respectively extend, and
each of the plurality of grooves is defined by:
  a bottom portion of the base layer which is closest to the circuit board;
  a through-hole among the plurality of through-holes which is defined through the bottom portion; and
  a sidewall portion connecting the bottom portion and the boundary portion to each other.

16. The display device of claim 14, wherein
each of the plurality of light emitting elements emits first color light as the light from the plurality of light emitting elements, and
the light control pattern layer comprises:
  a fluorescent material which wavelength-converts the first color light,
  a pigment or a dye which absorbs the first color light, or
  a pigment or a dye which reflects the first color light.

17. The display device of claim 14, wherein
each of the plurality of light emitting elements emits blue light as the light from the plurality of light emitting elements, and
the light control pattern layer comprises a yttrium aluminum garnet fluorescent material, a yellow pigment, a blue pigment or a black pigment.

18. The display device of claim 14, further comprising an optical member between the light source member and the display panel,
wherein the optical member comprises a color conversion layer comprising a quantum dot.

19. A method of manufacturing a light source member, the method comprising:
providing a plurality of light emitting elements on a circuit board;
providing a reflection plate comprising in order from the circuit board:
a base layer having a cross-sectional shape defining both a plurality of grooves, and a plurality of through-holes which respectively correspond to the plurality of grooves, and
a light control pattern layer on the base layer and in the plurality of grooves which are defined by the base layer, which wavelength-converts, absorbs or reflects light, the light control pattern layer having a shape corresponding to the cross-sectional shape of the base layer,
wherein the plurality of light emitting elements are in the plurality of grooves which include the light control pattern layer on the base layer; and
providing the circuit board having the plurality of light emitting elements thereon combined with the reflection plate having the plurality of grooves, the plurality of through-holes and the light control pattern layer, to respectively extend the plurality of light emitting elements into the plurality of through-holes to provide the light source member,
wherein the providing of the reflection plate comprises:
providing the plurality of grooves and the plurality of through-holes in the base layer;
providing a light control pattern material on the base layer, at positions corresponding to the plurality of grooves; and
providing the light control pattern layer from the light control pattern material, by curing the light control pattern material,
wherein the providing of the plurality of grooves in the base layer and the providing of the light control pattern material on the base layer, are performed at a same time.

20. The method of claim 19, wherein the providing of the plurality of grooves and the plurality of through-holes in the base layer comprises pressing a mold to the base layer to both:
deform the base layer in a direction toward the circuit board, which provides the plurality of grooves, and
remove portions of the base layer respectively corresponding to the plurality of grooves, which provides the plurality of through-holes.

21. The method of claim 20, wherein the pressing of the mold to the base layer comprises defining:
each of the plurality of grooves including:
a bottom portion of the base layer which is closest to the circuit board and in which a through-hole among the plurality of through-holes is defined, and
a sidewall portion of the base layer inclined from the bottom portion, and a boundary portion of the base layer between grooves adjacent to teach other.

22. The method of claim 21, wherein the providing of the light control pattern material on the base layer comprises:
providing the light control pattern material on the mold at locations corresponding to the light control pattern layer, and
by the pressing of the mold to the base layer, transferring the light control pattern material from the mold to at least one among the sidewall portion, the boundary portion and the bottom portion of the base layer.

23. The method of claim 21, wherein
the mold comprises:
a plurality of first protruding portions corresponding to the plurality of grooves, the plurality of first protruding portions each comprising a side surface corresponding to the sidewall portion of the base layer,
a plurality of second protruding portions respectively extended from the plurality of first protruding portions and corresponding to the plurality of through-holes, and
a support portion common to each of the plurality of first protruding portions and the plurality of second protruding portions and from which each of the plurality of first protruding portions and the plurality of second protruding portions extends, and
the providing of the light control pattern material on the base layer, at the positions corresponding to the plurality of grooves, comprises providing the light control pattern material to the side surface of each of the plurality of first protruding portions of the mold.

24. The method of claim 23, wherein
the side surface of each of the plurality of first protruding portions of the mold comprises a plurality of holes, and
the providing of the light control pattern material on the base layer, at the positions corresponding to the plurality of grooves, comprises providing the light control pattern material in the plurality of holes of the mold.

25. The method of claim 19, wherein
the base layer comprises polyethylene terephthalate, and
the light control pattern material comprises a fluorescent material, a quantum dot, a pigment or a dye.

* * * * *